United States Patent
Einziger et al.

(10) Patent No.: US 10,912,163 B2
(45) Date of Patent: Feb. 2, 2021

(54) SPATIALLY CONTROLLED ENERGY DELIVERY

(71) Applicant: Goji Limited, Hamilton (BM)

(72) Inventors: Pinchas Einziger, Haifa (IL); Eran Ben-Shmuel, Savyon (IL); Alexander Bilchinsky, Monosson-Yahud (IL); Amit Rappel, Ofra (IL)

(73) Assignee: GOJI Limited, Hamilton (BM)

( * ) Notice: Subject to any disclaimer, the term of this patent is extended or adjusted under 35 U.S.C. 154(b) by 496 days.

(21) Appl. No.: 15/440,670

(22) Filed: Feb. 23, 2017

(65) Prior Publication Data

US 2017/0164432 A1 Jun. 8, 2017

Related U.S. Application Data

(63) Continuation of application No. 13/695,963, filed as application No. PCT/IB2011/001387 on May 3, 2011, now abandoned.

(Continued)

(51) Int. Cl.
*H05B 6/68* (2006.01)
*G01S 13/89* (2006.01)
(Continued)

(52) U.S. Cl.
CPC .............. *H05B 6/68* (2013.01); *B01J 19/126* (2013.01); *B01J 19/129* (2013.01); *F26B 3/347* (2013.01);
(Continued)

(58) Field of Classification Search
CPC ......... H05B 6/705; H05B 6/72; H05B 6/6447
See application file for complete search history.

(56) References Cited

U.S. PATENT DOCUMENTS

| | | |
|---|---|---|
| 3,019,399 A | 1/1962 | Lanciani et al. |
| 4,196,332 A | 4/1980 | MacKay et al. |

(Continued)

FOREIGN PATENT DOCUMENTS

| | | |
|---|---|---|
| EP | 0526297 A1 | 2/1993 |
| EP | 1021067 A2 | 7/2000 |

(Continued)

OTHER PUBLICATIONS

Minutes of the Oral Proceeding in Before the Opposition Division for Notice of Opposition, Ref. P53972EP-K, EP Application No. 11729472.8-1808, Patent No. EP-B-2 446 703, dated Oct. 9, 2017, 9 pages.

(Continued)

*Primary Examiner* — Dana Ross
*Assistant Examiner* — Lawrence H Samuels
(74) *Attorney, Agent, or Firm* — Finnegan, Henderson, Farabow, Garrett & Dunner LLP

(57) ABSTRACT

Apparatuses and methods are provided for applying radio frequency (RF) energy from a source of electromagnetic energy to an object in an energy application zone. At least one processor may be configured to acquire information indicative of electromagnetic energy loss associated with at least a portion of the energy application zone. The processor may be further configured to determine a weight to be applied to each of a plurality of electromagnetic field patterns each having a known electromagnetic field intensity distribution and cause the source to supply each of the plurality of electromagnetic field patterns to the energy application zone at the determined weights.

24 Claims, 15 Drawing Sheets

Related U.S. Application Data

(60) Provisional application No. 61/282,980, filed on May 3, 2010, provisional application No. 61/282,984, filed on May 3, 2010, provisional application No. 61/282,981, filed on May 3, 2010, provisional application No. 61/282,985, filed on May 3, 2010, provisional application No. 61/282,983, filed on May 3, 2010, provisional application No. 61/282,986, filed on May 3, 2010.

(51) Int. Cl.
*H05B 6/70* (2006.01)
*H05B 6/72* (2006.01)
*H05B 6/64* (2006.01)
*B01J 19/12* (2006.01)
*F26B 3/347* (2006.01)

(52) U.S. Cl.
CPC .............. *G01S 13/89* (2013.01); *H05B 6/64* (2013.01); *H05B 6/6447* (2013.01); *H05B 6/686* (2013.01); *H05B 6/70* (2013.01); *H05B 6/705* (2013.01); *H05B 6/72* (2013.01); *B01J 2219/0871* (2013.01); *B01J 2219/1203* (2013.01); *B01J 2219/1206* (2013.01); *Y02B 40/00* (2013.01)

(56) References Cited

U.S. PATENT DOCUMENTS

| | | | |
|---|---|---|---|
| 4,341,937 A | 7/1982 | Staats | |
| 4,464,554 A | 8/1984 | Bakanowski et al. | |
| 5,441,532 A | 8/1995 | Fenn | |
| 5,485,743 A | 1/1996 | Taherian et al. | |
| 5,632,921 A | 5/1997 | Risman et al. | |
| 5,828,040 A | 10/1998 | Risman | |
| 5,834,744 A | 11/1998 | Risman | |
| 5,961,871 A | 10/1999 | Bible et al. | |
| 6,104,018 A | 8/2000 | Varma et al. | |
| 6,884,979 B1* | 4/2005 | Torngren | H05B 6/686 219/697 |
| 8,492,686 B2 | 7/2013 | Bilchinsky et al. | |
| 8,922,969 B2* | 12/2014 | Sigalov | H05B 6/645 219/745 |
| 9,215,756 B2 | 12/2015 | Bilchinsky et al. | |
| 2003/0047559 A1 | 3/2003 | Watanabe et al. | |
| 2008/0290087 A1* | 11/2008 | Ben-Shmuel | A23L 3/01 219/748 |
| 2009/0045191 A1* | 2/2009 | Ben-Shmuel | H05B 6/647 219/746 |
| 2009/0057302 A1* | 3/2009 | Ben-Shmuel | H05B 6/72 219/748 |
| 2009/0071110 A1 | 3/2009 | Gonze et al. | |
| 2009/0178858 A1 | 7/2009 | Daniels et al. | |
| 2009/0236333 A1* | 9/2009 | Ben-Shmuel | H05B 6/6402 219/702 |
| 2009/0236334 A1* | 9/2009 | Ben-Shmuel | B65D 81/3453 219/703 |
| 2009/0236335 A1* | 9/2009 | Ben-Shmuel | H05B 6/6402 219/710 |
| 2010/0115785 A1* | 5/2010 | Ben-Shmuel | D06F 58/2663 34/260 |
| 2010/0155392 A1 | 6/2010 | Nordh et al. | |
| 2010/0176121 A1* | 7/2010 | Nobue | H05B 6/686 219/716 |
| 2010/0176123 A1 | 7/2010 | Mihara et al. | |
| 2010/0224623 A1* | 9/2010 | Yasui | H05B 6/686 219/702 |
| 2010/0237067 A1 | 9/2010 | Nordh et al. | |
| 2010/0252551 A1* | 10/2010 | Nordh | H05B 6/74 219/702 |
| 2010/0312801 A1 | 12/2010 | Ostrovsky et al. | |
| 2011/0033584 A1* | 2/2011 | Bilchinsky | A23B 4/012 426/129 |
| 2011/0108548 A1 | 5/2011 | Nobue et al. | |
| 2011/0198343 A1* | 8/2011 | Bilchinsky | H05B 6/688 219/678 |
| 2013/0146590 A1* | 6/2013 | Einziger | H05B 6/64 219/709 |

FOREIGN PATENT DOCUMENTS

| | | |
|---|---|---|
| EP | 2 051 564 | 4/2009 |
| EP | 2051564 A1 | 4/2009 |
| JP | S 58-212092 | 12/1983 |
| JP | 2001-052852 A2 | 2/2001 |
| JP | 2001-196158 A2 | 7/2001 |
| JP | A 2001-307868 | 11/2001 |
| JP | 2002-260840 A2 | 9/2002 |
| JP | 2008-310969 | 12/2008 |
| WO | WO 91/07069 | 5/1991 |
| WO | WO 1991/07069 | 5/1991 |
| WO | WO 1998/35532 | 8/1998 |
| WO | WO 02/23953 | 3/2002 |
| WO | WO 2002/23953 A1 | 3/2002 |
| WO | WO 2008/007368 A3 | 1/2008 |
| WO | WO 2009/050839 A1 | 4/2009 |
| WO | WO 2009/050893 A1 | 4/2009 |

OTHER PUBLICATIONS

Opposition Decision, Ref. P53972EP-K, EP Application No. 11729472.8-1808, Patent No. EP-B-2 446 703, dated Oct. 9, 2017, 13 pages.
Letter dated Jul. 12, 2017, from Whirlpool Corporation to the European Patent Office in reference to merger and name change in regards to summons to attend oral proceedings relating to EP 2446703, 4 pages.
Communication of Notices of Opposition, Ref. P53972EP-K, EP Application No. 11729472.8-1808, Patent No. EP-B-2 446 703, dated Feb. 19, 2016, 2 pages.
Communication of a Notice of Opposition, Ref. P53972EP-K, EP Application No. 11729472.8-1808, Patent No. EP-B-2 446 703, dated Jan. 22, 2016, 9 pages.
Summons to attend Oral Proceedings, Ref. P53972EP-K, EP Application No. 11729472.8-1808, Patent No. EP-B-2 446 703, dated Dec. 9, 2016, 7 pages.
Brief Communication for Notice of Opposition of Jan. 14, 2016, Ref. P53972EP-K, EP Application No. 11729472.8-1808, Patent No. EP-B-2 446 703, dated Sep. 9, 2016, 1 page.
Annex 1 (SA871), List of Documents in Opposition against EP2446703B1, 23 pages.
A.J. Sangster and K.I. Sinclair, "Multimode Degenerate Mode Cavity for Microwave Hyperthermia Treatment", IEE Proc.-Microw. Antennas Propag., vol. 153, No. 1, Feb. 2006, pp. 75-82.
K.I. Sinclair, "Focussed Microwave Heating Using Degenerate and Non-Degenerate Cavity Modes", Heriot-Watt University, School of Engineering and Physical Sciences, May 2009, 182 pages.
S.K. Chatterjee, M.Sc., "Microwave Cavity Resonators Some Perturbation Effects and their Applications", Journal of the British Institution of Radio Engineers, Oct. 1953, pp. 475-484.
A. Cunliffe, Ph.D., and L.E.S. Mathias, M.Sc., "Some Perturbation Effects in Cavity Resonators", Paper No. 1018, Radio Section, Apr. 12, 1950, pp. 367-376.
D.M. Pozar, "Microwave Engineering", University of Massachusetts at Amherst, Second Edition, Copyright © 1998 by John Willey & Sons, Inc., 4 pages.
D. Stuerga and M. Lallemant, "Far Beyond Small Perturbations", Journal of Microwave and Electromagnetic Energy, vol. 28 No. 2, 1993, © Internal Microwave Power Institute, pp. 73-83.
T. Randelović et al., "Modelling of Microwave Applicators with an Excitation through the Waveguide Using TLM Method", Serbian Journal of Electrical Engineering, vol. 2, No. 2, Nov. 2005, pp. 137-146.
T. Santos et al., "3D Electromagnetic Field Simulation in Microwave Ovens: a Tool to Control Thermal Runaway", Excerpt from the Proceedings of the Comsol Conference 2010 Paris, 5 pages.

(56) References Cited

OTHER PUBLICATIONS

Bows et al., Microwave phase control heating, International Journal of Food Science and Technology 1999, v. 34, pp. 295-304.
Communication pursuant to Article 94(3) EPC related to EP Application No. 11743326.8, dated Feb. 21, 2014.
Communication pursuant to Article 94(3) EPC related to EP Application No. 11729472.8, dated Feb. 28, 2014.
Communication pursuant to Article 94(3) EPC related to EP Application No. 11731499.7, dated Feb. 21, 2014.
Communication pursuant to Article 94(3) EPC related to EP Application No. 11738283.8, dated Feb. 20, 2014.
Mammano, Resonant Mode Converter Topologies, 2001, Texas Instruments Incorporated, Topic 1, pp. 1-12.
Narvaez, Truine Ethics: The neurobiological roots of our multiple moralities, New Ideas in Psychology 26 (2008) 95-119.
Schubert et al., Resonant cavity light-emitting diode, Appl. Phys., Lett. vol. 60, No. 8, 1992, pp. 921-923.
Notice of Opposition, Ref. P53963EP1, EP Application No. 15161925.1-1808, U.S. Pat. No. 2,914,062, dated Sep. 15, 2017, 49 pages.
Notice of Opposition, Ref. P53963EP1, EP Application No. 15161925.1-1808, U.S. Pat. No. 2,914,062, dated Sep. 15, 2017, 27 pages.
Summons to attend Oral Proceedings, Ref. P53963EP-K, EP Application No. 11731499.7-1808, U.S. Pat. No. 2,446,704, dated May 18, 2017, 16 pages.
Minutes of the Oral Proceedings before the Opposition Division, Ref. P53963EP-K, EP Application No. 11731499.7-1204, U.S. Pat. No. 2,446,704, dated Mar. 2, 2018, 10 pages.
Interlocutory Decision in Opposition, Ref. P53963EP-K, EP Application No. 11731499.7-1204, U.S. Pat. No. 2,446,704, dated Mar. 2, 2018, 14 pages.
Opponent's Response to Grounds of Appeal, Appeal No. T2718/17-3.5.02, Ref. P53972EP-K / APPR, EP Application No. 11729472.8, Patent No. EP 2446703, 11 pages, dated Sep. 24, 2018.
Monzó-Cabrera, Juan et al.; "Feedback Control Procedure for Energy Efficiency Optimization of Microwave-Heating Ovens"; Measurement 42 (2009); pp. 1257-1262.
Notice of Opposition to European Patent No. EP 2446704, and Grounds for Opposition of same, issued by the European Patent Office, dated Jan. 28, 2016.
Office Action(Decision of Rejection) issued in a corresponding Japanese Application, No. 2013-508575, dated Sep. 29, 2015.
Office Action (Notice of Rejection) issued in a corresponding Japanese Application, No. 2013-508576, dated Dec. 21, 2015.

Omar, A. S.; "High Resolution Resonator Method for Accurate Measurement of Inhomogeneous Dielectric Constants"; 1999 IEEE MTT-S Digest; pp. 171-174.
Pedreño-Molina, J. L. et al.; "A New Procedure for Power Efficiency Optimization in Microwave Ovens Based on Thermographic Measurements and Load Location Search"; International Communications in Heat and Mass Transfer 34 (2007); pp. 564-569.
Peyre, F. et al.; "Influence of the Dielectric Property on Microwave Oven Heating Patterns: Application to Food Materials"; International Microwave Power Institute, vol. 32, No. 1 (1997); pp. 3-15.
Requena-Pérez, M. E. et al.; "Multimode Cavity Efficiency Optimization by Optimum Load Location-Experimental Approach"; IEEE Transactions on Microwave Theory and Techniques, vol. 53, No. 6; Jun., 2005; pp. 2114-2120.
Santos, T. et al.; "3D Electromagnetic Field Simulation in Microwave Ovens: A Tool to Control Thermal Runaway"; Excerpt from the Proceedings of the Comsol Conference 2010 Paris.
Stuerga, D. et al.; "Far Beyond Small Perturbations;" International Microwave Power Institute, vol. 28, No. 2 (1993); pp. 73-83.
Decision revoking the European Patent in the Oral Proceedings before the Opposition Division of the EPO, Ref. P53963EP1, EP Application No. 15161925.1, U.S. Pat. No. 2,914,062, dated Dec. 12, 2019, 28 pages.
Oral Proceedings Minutes before the Opposition Division of the EPO, Ref. P53963EP1, EP Application No. 15161925.1, U.S. Pat. No. 2,914,062, dated Dec. 12, 2019, 21 pages.
Written Submissions on behalf of Whirlpool EMEA S.p.A, Ref. P53963EP1, EP Application No. 15161925.1, U.S. Pat. No. 2,914,062, dated Sep. 9, 2019, 20 pages.
Written Submissions on behalf of Stefan Haas, P53963EP1, EP Application No. 15161925.1, U.S. Pat. No. 2,914,062, dated Sep. 11, 2019, 8 pages.
Letter from Eisenführ Speiser re: Stefan Haas Written Submissions, EP Application No. 15161925.1, U.S. Pat. No. 2,914,062, dated Oct. 18, 2019, 1 page, enclosing documents D15 and D16.
Patty J. Annis, "Design and use of Domestic Microwave Ovens", Journal of Food Protection, vol. 43, No. 8, pp. 629-632 (Aug. 1980) (4 pages), document D15 from Eisenführ Speiser Letter dated Oct. 18, 2019, re: Stefan Haas Written Submissions.
Handout explaining the calculation of a largest resonant wavelength in a cavity of a consumer microwave oven (1 page), document D16 from Eisenführ Speiser Letter dated Oct. 18, 2019, re: Stefan Haas Written Submissions.

\* cited by examiner

SPATIALLY CONTROLLED ENERGY DELIVERY

RELATED APPLICATIONS

The present application is a continuation of application Ser. No. 13/695,963, filed Nov. 2, 2012, which is a national phase application of International Application No. PCT/IB2011/001387, filed May 3, 2011, which claims the benefit of priority to 1) U.S. Provisional Patent Application No. 61/282,980, filed on May 3, 2010; 2) U.S. Provisional Patent Application No. 61/282,981, filed on May 3, 2010; 3) U.S. Provisional Patent Application No. 61/282,983, filed on May 3, 2010; 4) U.S. Provisional Patent Application No. 61/282,984, filed on May 3, 2010; 5) U.S. Provisional Patent Application No. 61/282,985, filed on May 3, 2010; and 6) U.S. Provisional Patent Application No. 61/282,986, filed on May 3, 2010. Each of these applications is fully incorporated herein in its entirety.

TECHNICAL FIELD

This application relates to apparatuses and methods for applying electromagnetic energy to an object.

BACKGROUND

Electromagnetic waves are commonly used to apply energy to objects. Typically, such objects are located in a cavity configured to receive electromagnetic energy. However, because the electromagnetic field distribution may be dependent on the properties (e.g., size of the object), location, and orientation, of the object as well as characteristics of the source from which the energy is applied, it is often difficult to apply electromagnetic energy in a controllable manner. One example of an electromagnetic energy application device is a microwave oven. In a microwave oven, microwaves are used to apply electromagnetic energy from an energy source to the object through air. The electromagnetic energy is then absorbed by the object and converted to thermal energy, causing the temperature of the object to rise. While typical microwave ovens heat faster than conventional ovens, a microwave oven will often exhibit hot and cold spots in the object being heated due to a phenomena known as "standing waves". A standing wave, also known as a stationary wave, remains in a constant position and is characterized by local maximum and minimum amplitudes of electrical field intensity. Because the amplitude of electrical field intensity is often proportional to the heating capability of microwaves when an object is present, standing waves often result in uneven heating of the object, which is usually an undesirable result.

Conventional microwave ovens may include designs intended to reduce uneven heating caused by the standing wave effect. For example, some conventional microwave ovens utilize field disturbance elements to disrupt standing waves in a random manner. In another example, some conventional microwave ovens attempt to reduce the standing wave effect by rotating the object to be heated.

SUMMARY

An aspect of some embodiments of the invention concerns application of EM energy to an energy application zone in a controlled manner. In some embodiments, the energy is applied uniformly, such that all locations within the energy application zone or an object placed in the energy application zone receive substantially the same amount of EM energy. In some embodiments, the energy is applied in a non-uniform manner, such that some selected regions in the energy application zone or the object receive more energy than others.

EM energy is applied to the zone by EM waves. Each wave may excite in the energy application zone a different field pattern, and a corresponding field intensity distribution in the energy application zone.

In some embodiments, EM energy is applied to the EM zone by applying selected EM waves to the zone, each with a different field intensity distribution (may also be referred to as energy profile). The waves may be selected such that the sum of the intensities of all the selected waves is substantially the same all over the energy application zone or the object, although in each point in space, the field intensity of each wave is different from that of the others. This kind of energy application may result in uniform or substantially uniform spatial energy application with respect to the energy application zone or the object.

In some embodiments, the waves may be selected such that in some selected regions of the zone the sum of the intensities of the selected waves is larger than in other regions. This kind of energy application may result in non-uniform energy application, where more energy may be applied to the selected regions.

It is noted that the energy profile of an EM wave may change over time, for example, the field intensity may decay with time in all places. Additionally or alternatively, the field intensity may oscillate with time, for example, in sinusoidal manner. Other time evolutions of field patterns are also known to exist.

Consistent with some embodiments, EM waves may be selected such that the time average of the energy profile spatially distributes as required, for example, uniformly. Consistent with some embodiments, EM waves may be selected such that at each time the sum of the energy profiles is the same, although the energy profile of each wave changes with time.

Some embodiments of the invention may include an apparatus for applying electromagnetic energy to an object. The apparatus may include a source of electromagnetic energy and an energy application zone. At least one processor may be configured to acquire information indicative of electromagnetic energy loss associated with the object. The processor may also be configured to determine a weight to be applied to each of a plurality of electromagnetic field patterns. Additionally, the processor may be configured to cause the source to apply each of the plurality of electromagnetic field patterns to the energy application zone at the determined weights.

As used herein, an object (e.g., a processor) is described to be configured to perform a task (e.g., determine a weight to be applied to each of a plurality of electromagnetic field patterns), if, at least in some embodiments, the object performs this task in operation. Similarly, when a task (e.g., control a distribution of electromagnetic energy) is described to be in order to establish a target result (e.g., in order to apply a plurality of electromagnetic field patterns to the object) this means that, at least in some embodiments, the task is carried out such that the target result is accomplished.

An aspect of some embodiments of the invention includes an apparatus for applying electromagnetic energy from a source to an object in an energy application zone via at least one radiating element. The apparatus may include at least one processor configured to acquire volumetric energy transfer information associated with at least a portion of the energy application zone; determine a weight to be applied to each of a plurality of electromagnetic field patterns; and cause the source to excite each of the plurality of electromagnetic field patterns to the energy application zone at the determined weights. In some embodiments, each of the field patterns may have a known electromagnetic field intensity distribution.

An aspect of some embodiments of the invention may include an apparatus comprising a processor configured to acquire indication of amounts of energy to be transferred to at least two regions in the energy application zone. The processor may further be configured to determine a weight to be applied to each of a plurality of MSEs based on the acquired indication. Each of the MSEs may be associated with an electromagnetic field pattern distribution, and the weights may be determined such that the weighted sum of the associated distributions is substantially equal to the indicated amounts of energy. The processor may be further configured to cause a source of electromagnetic energy to supply each of the plurality of MSEs to the energy application zone at the determined weights.

An aspect of some embodiments of the invention may include a method for applying electromagnetic energy from a source of RF energy to an energy application zone via at least one radiating element. The method may include acquiring information indicative of electromagnetic energy losses, each of the losses being associated with a different portion of the energy application zone; and determining a weight to be applied to each of a plurality of electromagnetic field patterns based on the acquired information. The method may further include exciting each of the plurality of electromagnetic field patterns in the energy application zone at the determined weights.

The preceding summary is merely intended to provide the reader with a very brief flavor of a few aspects of the invention, and is not intended to restrict in any way the scope of the claimed invention. In addition, it is to be understood that both the foregoing general description and the following detailed description are exemplary and explanatory only and are not restrictive of the invention, as claimed.

It is noted that the term exemplary is used herein in the sense of serving as an example, instance, or illustration, and not necessarily as deserving imitation or excellent.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENTS

Reference will now be made in detail to exemplary embodiments of the invention, examples of which are illustrated in the accompanying drawings. When appropriate, the same reference numbers are used throughout the drawings to refer to the same or like parts.

Figure 1:
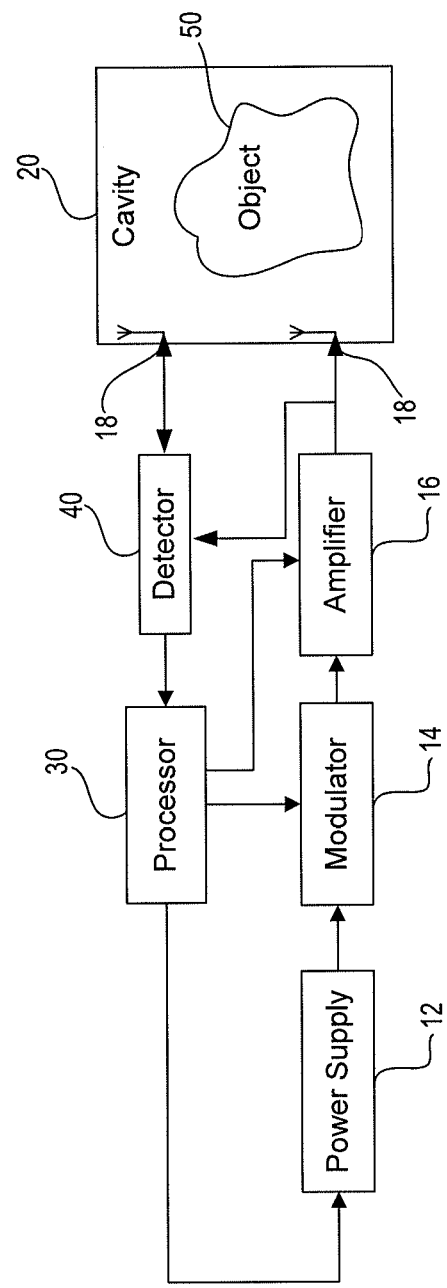
FIG. 1 provides a diagrammatic representation of an apparatus for applying electromagnetic energy to an object, in accordance with some exemplary embodiments of the present invention.

Embodiments of the invention may involve apparatuses and methods for applying electromagnetic energy to an object in an energy application zone. As used herein, the term apparatus may include any component or group of components described herein. For example, an apparatus may refer only to a processor, such as processor 30, as illustrated in FIG. 1. Alternatively or additionally, an apparatus may include a combination of a processor and one or more radiating elements; a processor, a cavity, and one or more radiating elements; a processor and a source of electromagnetic energy; a processor, a cavity, one or more radiating elements, and a source of electromagnetic energy; or any other combination of components described herein.

The term electromagnetic energy, as used herein, includes any or all portions of the electromagnetic spectrum, including but not limited to, radio frequency (RF), infrared (IR), near infrared, visible light, ultraviolet, etc. In some cases, applied electromagnetic energy may include RF energy with a wavelength of 100 km to 1 mm, which is a frequency of 3 KHz to 300 GHz. In some cases, RF energy within a narrower frequency range, e.g., 1 MHz-100 GHz, may be applied. Microwave and ultra high frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum. Electromagnetic energy in the RF band may be referred to as RF energy.

Similarly, for exemplary purposes, this disclosure contains a number of examples of electromagnetic energy used for heating. Again, these descriptions are provided to illustrate exemplary principles of the invention. The invention, as described and claimed, may provide benefit for various products and industrial, commercial, and consumer processes involving the application of energy, regardless of whether the application of energy results in a temperature rise. For example, electromagnetic energy may be applied to an object for heating, combusting, thawing, defrosting, cooking, drying, accelerating reactions, expanding, evaporating, fusing, causing or altering biologic processes, medical treatments, preventing freezing or cooling, maintaining the object within a desired temperature range, or any other application where it is desirable to apply energy.

Moreover, reference to an object (or load) to which electromagnetic energy is applied is not limited to a particular form. An object may include a liquid, solid, or gas, depending upon the particular process with which one or more embodiments of the invention are utilized, and the object may include composites or mixtures of matter in one or more differing phases. Further, although the term object is in the singular, it may refer to multiple items or detached parts or components. Thus, by way of non-limiting example, the term object may encompass such matter as food to be thawed or cooked; clothes or other material to be dried; frozen material (e.g. organs) to be thawed; chemicals to be reacted; fuel or other combustible material to be to be combusted; hydrated material to be dehydrated; gases to be expanded; liquids to be thawed, heated, boiled, or vaporized; blood or blood components (e.g. blood plasma or red blood cells) to be thawed and/or warmed; materials to be manufactured; components to be connected; or any other material for which there is a desire to even nominally apply electromagnetic energy.

In accordance with certain disclosed embodiments, an apparatus or method may involve the use of an energy application zone. An energy application zone may include any void, location, region, or area where electromagnetic energy may be applied. It may include a hollow, and/or may be filled or partially filled with liquids, solids, gases, or combinations thereof. By way of example only, an energy application zone may include the interior of an enclosure, interior of a partial enclosure (e.g. conveyor belt oven), interior of a conduit, open space, solid, or partial solid, which allows for the existence, propagation, and/or resonance of electromagnetic waves. The zone may be permanent or may be temporarily constituted for purposes of energy application. For ease of discussion, all such alternative energy application zones may alternatively be referred to as cavities, with the understanding that the term cavity implies no particular physical structure other than an area in which electromagnetic energy may be applied.

The energy application zone may be located in an oven, chamber, tank, dryer, thawer, dehydrator, reactor, furnace, cabinet, engine, chemical or biological processing apparatus, incinerator, material shaping or forming apparatus, conveyor, combustion zone, or any area where it may be desirable to apply energy. Thus, the electromagnetic energy application zone may include an electromagnetic resonator (also known as a cavity resonator, a resonant cavity, or a cavity). The electromagnetic energy may be delivered to an object when the object or a portion thereof is located in the energy application zone.

An energy application zone may have a predetermined shape (e.g., a shape determined beforehand) or a shape that is otherwise determinable. The energy application zone may assume any shape that permits electromagnetic wave propagation inside the energy application zone. For example, all or part of the energy application zone may have a cross-section that is spherical, hemisphere, rectangular, circular, triangular, oval, pentagonal, hexagonal, octagonal, elliptical, or any other shape or combination of shapes. It is also contemplated that the energy application zone may be closed (e.g., completely enclosed by conductor materials), bounded at least partially, open, (e.g., having non-bounded openings), or any other suitable configuration. The general methodology of the embodiments of the invention is not limited to any particular cavity shape, configuration, or degree of closure of the energy application zone, although in some applications, a high degree of closure may be preferred.

By way of example, an energy application zone, such as cavity 20, is represented diagrammatically in FIG. 1, where an object 50 is positioned in cavity 20. It is to be understood that object 50 need not be completely located in the energy application zone. That is, object 50 is considered "in" the energy application zone if at least a portion of the object is located in the zone.

Consistent with some of the presently disclosed embodiments, electromagnetic waves of at least one wavelength may resonate in the energy application zone. In other words, the energy application zone may support at least one resonant wavelength. For example, cavity 20 may be designed with dimensions permitting it to be resonant in a predetermined range of frequencies (e.g., the UHF or microwave range of frequencies, for example, between 300 MHz and 3 GHz, or between 400 MHz and 1 GHZ). It should be noted that, as used herein, "predetermined" can mean "determined beforehand." Depending on the intended application, the dimensions of cavity 20 may be designed to permit resonances in other ranges of frequencies in the electromagnetic spectrum. The term "resonant" or "resonance" refers to the tendency of electromagnetic waves to oscillate in the energy application zone at larger amplitudes at some frequencies (known as "resonance frequencies") than at others. Electromagnetic waves resonating at a particular resonance frequency may have a corresponding "resonance wavelength" that is inversely proportional to the resonance frequency, determined via $\lambda=c/f$, where $\lambda$ is the resonance wavelength, f is the resonance frequency, and c is the propagating speed of the electromagnetic waves in the energy application zone. The propagating speed may change depending on the medium through which the wave propagates. Therefore, when the energy application zone comprises more than one material (for instance, load and void), c may not be uniquely defined. Nevertheless, the resonance s may be determined using a slightly different relation, including, for example, using an estimation based on c of the major component, an effective c weighted by different components, an average of the c of miscellaneous components, or any other technique known in the art.

Electromagnetic waves in the energy application zone may exhibit a certain field pattern. A "field pattern" may refer to a spatial distribution of electromagnetic field. A field pattern may be characterized by, for example, the amplitude of electric field intensity distribution in the energy application zone. In general, electromagnetic field intensity is time varying and spatially dependent. That is, not only may the field intensity differ at different spatial locations, but for a given location in space, the field intensity can vary in time, for example, it may oscillate, often in a sinusoidal fashion. Therefore, at different spatial locations, the field intensities may not reach their maximum values (e.g., their amplitude values, between which the field intensities may oscillate in time and/or in space) at the same time. Because the field intensity amplitude at a given location can reveal information regarding the electromagnetic field, for example electromagnetic power density and energy transfer capability, the field pattern referred to herein may include a profile representing the amplitude of field intensity at one or more spatial locations. Such a field intensity amplitude profile may be the same as or different from a snapshot of the instant field intensity distribution at a given time in the zone. As used herein, the term "amplitude" is interchangeable with "magnitude".

A field pattern may be excited by applying electromagnetic energy to the energy application zone. For example, radiating an electromagnetic wave of certain frequency and phase may excite in a given energy application zone a certain electromagnetic field pattern. As used herein, the term "excited" is interchangeable with "generated," "created," and "applied". In general, a field pattern in an energy application zone may be uneven (e.g., non-uniform). That is, the field pattern may include areas with relatively high amplitudes of field intensity and other areas with relatively low amplitudes of field intensity. The rate of energy transfer (application) from an electromagnetic source to a region in an energy application zone may depend upon the amplitude of field intensity excited by the source in the region. For example, energy transfer may occur faster at areas with higher amplitude of field intensity than in areas with lower amplitude of field intensity. As used herein, the term "energy transfer" is interchangeable with "energy delivery" and "energy application".

When resonating waves (e.g., standing waves) are present in the zone, the excited field pattern may be substantially stable in space over time (e.g., the excited field pattern may exhibit a static amplitude of field intensity at any given position of the zone). As a result, the areas with relatively high amplitudes of field intensity and areas with relative low amplitudes of field intensity may stay substantially unchanged over time. Such relative stability of different areas with different characteristics may allow identification, localization, and utilization of them. For example, by identifying a location of one or more areas with relatively high amplitudes of field intensity associated with a particular field pattern, one may purposely excite this field pattern and utilize such areas, for example, to transfer electromagnetic energy to an object by placing the object in such areas, avoid energy transfer by placing the object outside of such areas, or transfer energy to certain regions of the object by controlling the overlap between the object and such areas. Alternatively, the object itself may stay the same, and the control of energy transfer may be achieved by exciting different field patterns and manipulating different areas of high/low amplitude of field intensity (with known locations, orientations, and/or other properties) to overlap with the object. Therefore, by controlling field patterns (e.g., by exciting selected field patterns), the amount of energy applied to certain regions in an object may be controlled. This process can be referred to as electromagnetic spatial filtering.

A field pattern may be represented as a linear combination of base field patterns known as "modes." Modes are a set of special field patterns that are linearly independent from each other. A mode or a combination of modes (e.g., a general field pattern), can be of any known type, including propagating, evanescent, and resonant. In some embodiments of the invention, the excited field pattern may include a combination of modes. Energy application may be more effectively controlled by exciting a variety of different modes in the energy application zone. In some embodiments, a set of field patterns, or more specifically, modes, may collectively have substantial field intensity at substantially the entire working volume of the zone.

In certain embodiments, an apparatus or method may involve the use of a source configured to deliver electromagnetic energy to the energy application zone. A source may include any component or components suitable for generating and supplying electromagnetic energy. For example, electromagnetic energy may be supplied to the energy application zone in the form of electromagnetic waves (also known as electromagnetic radiation) at predetermined wavelengths or frequencies. Electromagnetic waves may include propagating waves, resonating waves, standing waves, evanescent waves, and/or waves that travel through a medium in any other manner. Electromagnetic radiation carries energy that may be imparted to (or dissipated into) matter with which it interacts.

Referring to FIG. 1, the source may include a power supply 12, which includes one or more components configured to generate electromagnetic energy. For example, power supply 12 may include a magnetron configured to generate microwaves at one or more predetermined wavelengths or frequencies. In some embodiments, the magnetron may be configured to generate high power microwaves. Alternatively or additionally, power supply 12 may include a semiconductor oscillator, such as a voltage controlled oscillator, configured to generate AC waveforms (e.g., AC voltage or current) with a constant or varying frequency. AC waveforms may include sinusoidal waves, square waves, pulsed waves, triangular waves, or other types of waveforms with alternating polarities. Alternatively or additionally, a source of electromagnetic energy may include any other power supply, such as an electromagnetic field generator, electromagnetic flux generator, or any mechanism for generating electromagnetic energy.

In some embodiments, the apparatus may also include at least one modulator 14 configured to modify one or more characteristics associated with the electromagnetic energy generated by the power supply 12. The modulator may or may not be part of the source. For example, modulator 14 may be configured to modify one or more characteristics of a waveform, including amplitude (e.g., an amplitude difference between different radiating elements), phase, and/or frequency.

In some embodiments, modulator 14 may include at least one of a phase modulator, a frequency modulator, or an amplitude modulator configured to modify the phase, frequency, or amplitude of the AC waveform, respectively. These modulators are discussed in greater detail later, in connection with FIGS. 4A, 4B, 5, 6A, and 6B. In some embodiments, modulator 14 may be integrated as part of power supply 12 or the source, such that the AC waveforms generated by power supply 12 may have at least one of a varying frequency, a varying phase, and a varying amplitude.

The apparatus may also include an amplifier 16 for amplifying, for example, the AC waveforms before or after they are modified by modulator 14. The amplifier may or may not be part of the source. Amplifier 16 may include, for example, a power amplifier including one or more power transistors. Amplifier 16 may include a step-up transformer having more turns in the secondary winding than in the primary winding. In other embodiments, amplifier 16 may also include one or more power electronic devices such as bipolar transistors, MOSFETs, thyristors, insulated-gate bipolar transistors (IGBTs), integrated gate-commutated thyristors (IGCTs), and any other power electronic devices suitable for amplifying RF signals. The amplifier may include one or more signal converters, such as AC-to-AC converters, AC-to-DC-to-AC converters, or any other suitable type of converters. Alternatively or additionally, amplifier 16 may include any other device(s) or circuit(s) configured to scale up an input signal to a desired level.

The apparatus may also include at least one radiating element 18 configured to transfer or apply electromagnetic energy to object 50. The radiating element(s) may or may not be part of the source. Radiating element 18 may include one or more waveguides and/or one or more antennas (also known as power feeds) for supplying electromagnetic energy to object 50. For example, radiating element 18 may include slot antennas, dipole antennas, wire antenna, horn antenna, patch antennas, and other types of antennas. Additionally or alternatively, radiating element 18 may include waveguides or antennas of any other kind or form, or any other suitable structure from which electromagnetic energy may be emitted.

Power supply 12, modulator 14, amplifier 16, and radiating element 18 (or portions thereof) may be separate components or any combination of them may be integrated together to form a single unit. Power supply 12, modulator 14, amplifier 16, and radiating element 18 (or portions thereof) may be parts of the source. For example, a magnetron may be included in power supply 12 to generate electromagnetic energy, and a waveguide may be physically attached to the magnetron for transmitting energy to object 50. Alternatively or additionally, radiating element 18 may be separate from the magnetron. Similarly, other types of electromagnetic generators may be used where the radiating element may be, for example, physically separate from—or part of the generator or otherwise connected to the generator.

In some embodiments, more than one radiating element may be provided. The radiating elements may be located adjacent to, on, or in one or more surfaces defining the energy application zone. Alternatively or additionally, radiating elements 18 may be located inside and/or outside the energy application zone. When radiating elements 18 are located outside the zone, they may be coupled to elements that enable radiated energy to reach the energy application zone. Elements for allowing the radiated energy to reach the energy application zone may include, for example, wave guides and/or antennas. The orientation and configuration of each radiating element may be distinct or the same, as may be required for obtaining a target goal, for example, application of a desired energy distribution in the energy application zone. Furthermore, the location, orientation, and configuration of each radiating element may be predetermined before applying energy to object 50. In certain embodiments, these parameters may be dynamically adjusted, e.g., using a processor, while applying energy. The invention is not limited to radiating elements having particular structures or which are necessarily located in particular areas or regions. However, placing radiating elements in certain places, or selecting amplitudes of waves emitted from different radiating elements in accordance with their location, orientation, and/or configuration may be used in practicing the invention.

One or more of radiating element(s) 18 may be configured to receive electromagnetic energy, optionally, in addition to radiating electromagnetic energy. In other words, as used herein, the term radiating element may broadly refer to any structure from which electromagnetic energy may radiate and/or by which electromagnetic energy may be received, regardless of whether the structure was originally designed for purposes of radiating or receiving energy, and regardless of whether the structure serves any additional function. An apparatus or method in accordance with some embodiments of the invention may involve the use of one or more detectors configured to detect signals associated with electromagnetic waves received by the one or more radiating elements. For example, as shown in FIG. 1, a detector 40 may be coupled to radiating elements 18 that, when functioning as receivers, receive electromagnetic waves from cavity 20.

As used herein, the term "detector" may include one or more electric circuits configured to measure, sense, monitor, etc. at least one parameter associated with an electromagnetic wave. For example, such a detector may include a power meter configured to detect a level of power associated with an incident, reflected and/or transmitted electromagnetic wave (also known as "incident power," "reflected power," and "transmitted power", respectively). Such a detector may also include an amplitude detector configured to detect an amplitude of the wave, a phase detector configured to detect a phase of the wave, a frequency detector configured to detect a frequency of the wave, and/or any other circuit suitable for detecting a characteristic of an electromagnetic wave.

In certain embodiments, the source may supply incident power to a radiating element. In turn, this incident power may be supplied into the energy application zone by the radiating element. Of the incident power, a portion may be dissipated by the object and other structures associated with the zone. This portion of the incident power dissipated by the object may be referred to as dissipated power. Another portion of the incident power may be reflected. This portion of the incident power may be referred to as "reflected power". Reflected power may include, for example, power reflected back to the radiating element via the object and/or the energy application zone. Reflected power may also include power reflected at the interface between the radiating element and the zone (e.g., power that is reflected directly at the radiating element and does not flow into the zone). The rest of the incident power, other than the reflected power and dissipated power, may be transmitted to one or more receivers, which, in some embodiments, may also function as radiating elements. This portion of the incident power may be referred to as transmitted power. Some energy (power) may also leak to other places, such as into the walls of the cavity, through the door, etc. for simplicity, these portions of the energy (power) are not discussed herein, In some embodiments, it may be estimated that these portions of the energy (power) are substantially low and may be negligible.

In some embodiments, detector 40 may include a directional or a bi-directional coupler, configured to allow signals to flow from amplifier 16 to the radiating elements when the radiating elements function as transmitters (e.g., when radiate to apply energy to the zone), and to allow signals to flow from the radiating elements to the detector when the radiating elements function as receivers (e.g., when the radiating element receive energy). Additionally or alternatively, the directional coupler may be further configured to measure the power of a flowing signal. In some embodiments, the detector may also include other types of circuits that measure the voltage and/or current of a flowing signal.

An apparatus or method of some embodiments of the invention may involve the use of a processor. As used herein, the term "processor" may include an electric circuit that executes one or more instructions. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

The instructions executed by the processor may, for example, be preloaded into the processor or may be stored in a separate memory unit such as a RAM, a ROM, a hard disk, an optical disk, a magnetic medium, a flash memory, other permanent, fixed, or volatile memory, or any other mechanism capable of providing instructions to the processor. The processor(s) may be customized for a particular use, or can be configured for general-purpose use and perform different functions by executing different software.

If more than one processor is employed, all may be of similar construction, or they may be of differing constructions electrically connected or independent from one another. They may be separate circuits or integrated in a single circuit. When more than one processor is used, they may be configured to operate independently or collaboratively. They may be coupled electrically, magnetically, optically, acoustically, mechanically, wirelessly or in any other way permitting at least one signal to be communicated between them.

A single or multiple processors may be provided for the sole purpose of regulating the source. Alternatively, a single or multiple processors may be provided with the function of regulating the source in addition to providing other functions. For example, the same processor(s) used to regulate the source may also be integrated into a control circuit that provides additional control functions to components other than the source.

In some embodiments, the processor may regulate the source to generate or excite a desired field pattern in the energy application zone. For example, the processor may determine and/or select one or more modulation space elements to generate a desired field pattern in the energy application zone.

The term "modulation space" or "MS" is used to collectively refer to all the parameters that may affect a field pattern in the energy application zone and all combinations thereof. In some embodiments, the "MS" may include all possible components that may be used and their potential settings (either absolute or relative to others) and adjustable parameters associated with the components. For example, the "MS" may include a plurality of variable parameters, the number of antennas, their positioning and/or orientation (if modifiable), the useable bandwidth, a set of all useable frequencies and any combinations thereof, power settings, phases, etc. The MS may have any number of possible variable parameters, ranging between one parameter only (e.g., a one dimensional MS limited to frequency only or phase only—or other single parameter), two or more dimensions (e.g., varying frequency and amplitude together within the same MS), or many more.

Examples of energy application zone-related factors that may affect the modulation space include the dimensions and shape of the energy application zone and the materials from which the energy application zone is constructed. Examples of energy source-related factors that may affect the modulation space include amplitude, frequency, and phase of energy delivery. Examples of radiating element-related factors that may affect the modulation space include the type, number, size, shape, configuration, orientation and placement of the radiating elements.

Each variable parameter associated with the MS may be thought of as an MS dimension. By way of example, a three dimensional modulation space may include the three dimensions designated as frequency (F), phase ($\varphi$), and amplitude (A). That is—frequency, phase, and amplitude of the electromagnetic waves may be modulated during energy application, while all the other parameters may be predetermined and fixed during energy application. An MS may also be one dimensional where only one parameter is varied during the energy application, or may contain many dimensions that are varied.

The term "modulation space element" or "MSE" may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. Sequentially swept MSEs may not necessarily be related to each other. Rather, their MSE variables may differ significantly from MSE to MSE (or may be logically related). In some embodiments, the MSE variables may differ significantly from MSE to MSE, possibly with little or no logical relation among them, however in the aggregate, a group of working MSEs may achieve a desired energy application goal.

The processor may be configured to regulate the source in order to transfer (apply) different predetermined amounts of energy to different regions in the energy application zone. For example, within an energy application zone, it may be desirable to supply a certain amount of energy in one or more particular regions of the zone and, at the same time, supply a different amount of energy in one or more other regions of the zone. The term "region" may include any portion of the energy application zone, such as a cell, sub-volume, sub-division, discrete sub-space, or any sub-portion of a cavity. In one example, the energy application zone may include two regions. In another example, the energy application zone may include more than two regions. The regions may or may not overlap with each other, and the size of each region may or may not be the same. The terms "region" and "area" are used herein interchangeably.

The processor may also be configured to determine and/or adjust the locations of the regions within the energy application zone and also to adjust how much energy is supplied to each of those regions. In some embodiments, the processor may be configured to determine and/or adjust the locations of the regions according to the location of an object in the energy application zone. For example, processor 30 may be configured to monitor a feedback, e.g., reflective feedback, from the energy application zone to obtain information about a location of an object in the zone. In some embodiments, processor 30 may acquire this type of information through the use of one or more imaging devices. In some embodiments, the processor may be configured to determine the location of the regions in correspondence to the location of the object or to locations of different portions of the object. Optionally, processor 30 may be configured to cause differing amounts of electromagnetic energy to be transferred (applied) to these different portions of the object. The amount of energy actually dissipated in each region may depend on the field intensity at that region and the absorption characteristics of the corresponding portion of the object at that particular region.

Two regions may be located adjacent to one another within the energy application zone. For example, the energy application zone may include a region occupied by an object or a portion of an object, and another region defining an area distinct from the area of the object. In this case, these two regions may be adjacent to each other and separated by a boundary. As an example, the first region may correspond to a volume of soup within a cup, and the second region may include the cup that holds the soup and the space surrounding the cup.

In another example, the energy application zone may include two or more regions corresponding to regions within the object that exhibit differing absorption characteristics. For example, the first region may correspond to a top layer of soup that contains mostly water, and the second region may correspond to a bottom layer of the soup that contains a higher concentration of solids (e.g., potatoes and/or meat). Because of their differing energy absorption characteristics, it may be beneficial to excite field patterns with differing electrical field intensities within these two regions. Based on the difference in the local field intensities and the energy absorption characteristics of the two regions, the dissipated energy in each of the regions may be determined, optionally predetermined. Accordingly, the dissipated energy may be made substantially equal or different, as desired, across differing regions in the object, by selecting and controlling MSEs for constructing a suitable energy deliver scheme for applying the energy.

In order to apply differing targeted amounts of electromagnetic energy to differing regions (e.g., which may be defined or known before energy application) in the energy application zone, processor 30 may select a plurality of MSEs corresponding to a desired energy delivery scheme. For example, to transfer more energy to a first region than to a second region, a selected MSE may excite a field pattern having a higher field intensity in the first region than in the second. In some embodiments, in order to transfer more energy to a first region than to a second region, a selected group of MSEs may excite a corresponding group of field patterns, the field intensities of which sum to a higher value in the first region than in the second. An MSE may include one or more of amplitude, phase, and frequency of the radiated electromagnetic wave, a location, orientation, and configuration of each radiating element, or a combination of any of these parameters and any other controllable or selectable feature of the apparatus that is capable of affecting the electrical field pattern.

For example, as depicted in FIG. 1, an exemplary processor 30 may be electrically coupled to various components of the apparatus, for example, power supply 12, modulator 14, amplifier 16, and radiating elements 18. These components may or may not form part of the source. Processor 30 may be configured to execute instructions to provide physical conditions corresponding to one or more unique MSEs. For example, processor 30 may be configured to execute instructions that regulate one or more of these components.

For example, processor 30 may regulate the level of power supplied by power supply 12. Alternatively or additionally, processor 30 may also regulate the amplification ratio of amplifier 16, by, for example, switching the transistors in the amplifier. Alternatively or additionally, processor 30 may perform pulse-width-modulation control of amplifier 16 such that the amplifier outputs a desired waveform. Processor 30 may regulate modulations performed by modulator 14. Alternatively or additionally, processor 30 may regulate at least one of location, orientation, and configuration of each radiating element 18, for instance, through an electromechanical device. Such an electromechanical device may include a motor or other movable structure for rotating, pivoting, shifting, sliding or otherwise changing the orientation or location of one or more radiating elements 18. Processor 30 may be further configured to regulate any field adjusting elements located in the energy application zone, in order to change the field pattern in the zone. For example, the field adjusting elements may be configured to selectively direct the electromagnetic energy from the radiating element, or to reduce coupling to other radiating elements, e.g., radiating elements that act as receivers.

In accordance with some embodiments of the invention, processor 30 may regulate the one or more components of the source and parameters associated with the components, according to a predetermined scheme. For example, when a phase modulator is used, it may be controlled to perform a predetermined sequence of time delays on the AC waveform, such that the phase of the AC waveform is increased by a number of degrees (e.g., 10 degrees) for each of a series of time periods. Alternatively or additionally, the processor may dynamically and/or adaptively regulate apparatus components, e.g. to regulate modulation, based on feedback from the energy application zone. For example, processor 30 may be configured to receive an analog or digital feedback signal from detector 40, indicating an amount of electromagnetic energy received from cavity 20, and processor 30 may dynamically determine a time delay at the phase modulator for the next time period based on the received feedback signal.

Processor 30 may also be configured to regulate a frequency modulator in order to alter a frequency of at least one electromagnetic wave supplied to the energy application zone. Such a frequency modulator may be configured to adjust the frequency of an AC waveform. By way of example, the frequency modulator may include a semiconductor oscillator, for example oscillator 22 illustrated in FIG. 4A, and may be configured to generate an AC waveform oscillating at a predetermined frequency. The predetermined frequency may be in association with an input voltage, current, or other analog or digital signals. For example, a voltage controlled oscillator may be configured to generate waveforms at frequencies proportional to the input voltage, current, or other suitable input signals.

In some embodiments, the source may be configured to transfer electromagnetic energy at a predetermined wavelength that satisfies a modal condition. The modal condition can be expressed as a relationship between the applied wavelength $\lambda_1$ and the largest resonant wavelength $\lambda_0$ that may excite a mode in the energy application zone.

When the modal condition is satisfied, energy delivery (transfer) to the object may be better controlled and made more efficient. In some embodiments, the modal condition may correspond to a condition in which electromagnetic energy is being delivered at a wavelength larger than one fourth of the largest resonance wavelength $\lambda_0$ in cavity 20, i.e., $\lambda_1 \geq \lambda_0/4$. In other embodiments, a different relationship between the wavelength of the applied electromagnetic energy supplied by the source and the largest resonant wavelength supported by the energy application zone may be applied in order to meet the modal condition. In some embodiments, the modal condition is met when low order modes are excited, e.g., m*n is below 30, 40, or 50 (wherein m and n are integers representing the mode number in different axes, e.g., x and y).

Processor 30 may be configured to determine the largest resonant wavelength $\lambda_0$. In some embodiments, the largest resonant wavelength may be known in advance (e.g., programmed into the processor). The largest resonant wavelength $\lambda_0$ may be determined uniquely based on the geometry of cavity 20. Consistent with some embodiments, the largest resonant wavelength of any given energy application zone may be determined or estimated experimentally, mathematically, and/or by simulation. For example, if the energy application zone corresponds to rectangular cavity 200 (FIG. 2), which is of dimensions a×b×c, and a>b>c, then the largest resonant wavelength $\lambda_0$ may be given by $$\frac{2ab}{\sqrt{a^2+b^2}} \frac{2ab}{\sqrt{a^2+b^2}}.$$

Figure 2:
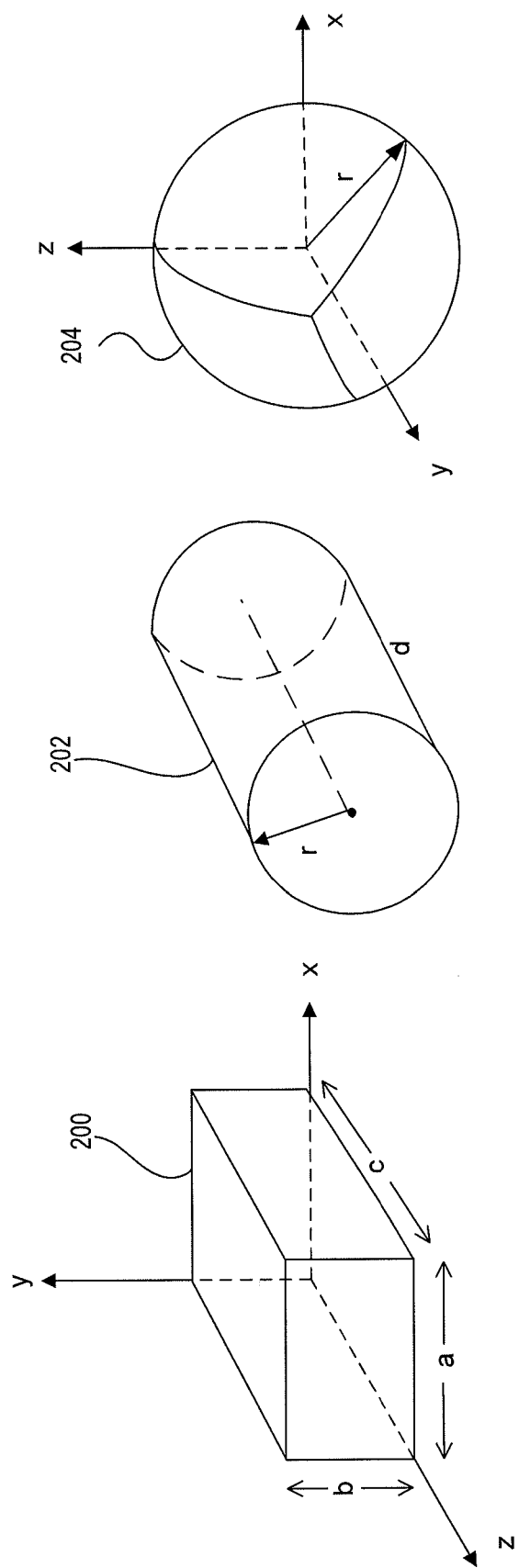
FIG. 2 provides a diagrammatic representation of a rectangular cavity in a Cartesian coordinate system, a cylindrical cavity in a cylindrical coordinate system, and a spherical cavity in a spherical coordinate system.

As another example, if the energy application zone corresponds to cubic cavity, which is of dimensions a×a×a, then the largest resonant wavelength $\lambda_0$ may be given by $\sqrt{2}a$. As yet another example, if the energy application zone corresponds to cylindrical cavity 202 (For example as illustrated in FIG. 2) of radius r and length d, then if 2r>d, the largest resonant wavelength $\lambda 0$ may be given by $$\frac{2\pi r}{2.405},$$

and if 2r<d, the largest resonant wavelength $\lambda_0$ may be given by $$\frac{2\pi r}{\sqrt{1.841^2 + \left(\frac{\pi r}{d}\right)^2}} \frac{2\pi r}{\sqrt{1.841^2 + \left(\frac{\pi r}{d}\right)^2}}.$$

As yet another example, if the energy application zone corresponds to spherical cavity 204 of radius r, then the largest resonant wavelength $\lambda_0$ may be given by $$\frac{2\pi r}{2.744} \frac{2\pi r}{2.744}.$$

Once the largest resonant wavelength associated with the energy application zone is determined, the at least one processor may be configured to determine the wavelength or wavelengths to be used for transferring the electromagnetic energy to the energy application zone, according to the modal condition.

Alternatively or additionally, the modal condition may be expressed in terms of frequency. Because there is a relationship between wavelengths $\lambda_1$ and $\lambda_0$ and their corresponding frequencies $f_1$ and $f_0$, such that $f_1 = c/\lambda_1$ and $f_0 = c/\lambda_0$. The modal condition may be expressed as $f_1 \leq 4f_0$. That is, the electromagnetic energy may be applied at a predetermined frequency that is lower than about four times the lowest resonance frequency in the energy application zone. In some embodiments, the largest resonant wavelength may be known in advance (e.g., programmed into a processor).

In addition, because the largest resonant wavelength $\lambda_0$ has a unique relationship with the dimensions of the energy application zone, the modal condition may also be expressed as a relationship between the dimensions of the energy application zone and the applied wavelength $\lambda_1$. For example, for a cubic cavity having dimensions a×a×a, the modal condition may be expressed as $\lambda_1 \geq \sqrt{2}a/4$. As another example, for spherical cavity 204 (for example as illustrated in FIG. 2 having radius r, the modal condition may be expressed as $$\lambda_1 \geq \frac{\pi r}{5.488} \geq \frac{\pi r}{5.488}.$$

A cavity whose dimensions satisfy the modal condition in respect of electromagnetic energy supplied to the cavity, is referred to herein as a modal cavity.

In some cases, the energy application zone may have a particular region being covered by areas with relatively high amplitudes of field intensity (e.g., from a certain set of field patterns) and also by areas with relatively low amplitudes of field intensity (e.g., from another set of field patterns). Field patterns may be selectively chosen to target energy application to selected regions of the energy application zone. For example, energy applications to any two regions in the energy application zone may be differentiated from one another by taking advantage of non-uniform distributions of maximal and minimal amplitudes of field intensity in each field pattern. In certain embodiments, the source may be configured and/or controlled to supply electromagnetic energy in a manner such that relatively low amplitude field intensities are supplied to predetermined areas of the energy application zone and higher amplitude field intensities are supplied to other predetermined areas of the energy application zone.

As used herein, an area with relatively high amplitude field intensity may be referred to as a "hot spot," and an area with relatively low amplitude field intensity may be referred to as a "cold spot." Although "hot spots" and "cold spots" may refer to spatial locations with different temperatures within an object due to uneven absorption of electromagnetic energy, the same teams may also refer to spatial locations where the electromagnetic field intensities have different amplitudes, regardless of whether an object is present.

Figure 3B:
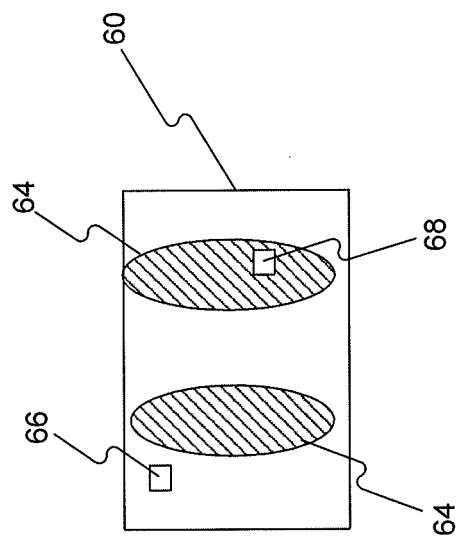
FIGS. 3A and 3B represent exemplary field patterns in a modal cavity consistent with principles of the invention.
Figure 3A:
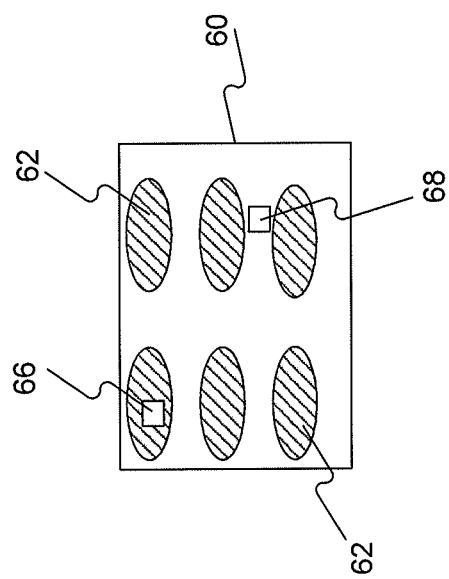

In modal cavity 60, as illustrated in FIGS. 3A and 3B, field patterns may be excited, such that each has a plurality of hot spots 62 and 64 (shaded areas) and cold spots (non-shaded areas). Some of the field patterns excitable in an energy application zone are named "modes." Modes form a set of special field patterns that are linearly independent from each other and orthogonal to one another. As referred herein, two field patterns are orthogonal to each other if the integral of the scalar product of the two fields associated with the two modes over the energy application zone is zero. A mode or a combination of modes (e.g., a general field pattern), can be of any known type, including propagating, evanescent, and resonant. In some embodiments, the excited field pattern includes a combination of modes.

It is hereby noted that while FIGS. 3A-3B diagrammatically illustrate hot spots as having a clear and defined border, in reality the intensity may change in a more gradual manner between hot spots and cold spots. Furthermore, different hot spots may have different field intensity amplitudes and/or may have areas with different field intensity amplitudes within a hotspot. Energy transfer to the object may occur in all regions of the object that coincide with regions of the field pattern, where the field pattern has non-zero field intensity, and is not necessarily limited to areas coinciding with hot spots. The extent of heating may depend, among other things, on the intensity of the field to which the object is exposed and the duration of exposure.

A field pattern that is excited with a wave having a given frequency may be represented mathematically as a linear combination of modes. The modes may include an infinite number of evanescent modes and a finite number of propagating modes (some of which may be resonant modes). In general, fewer propagating modes may be excited in a modal cavity than in a non-modal cavity. Again, some of the supported propagating modes may be resonant modes. By nature, the evanescent modes have a very small percent of power (or energy) out of the total power (or energy) used to excite the field pattern, and the vast majority of the total power (and energy) is carried by propagating modes.

As explained in more detail below, in some embodiments, one or more radiating elements may be placed such that some undesired modes may be rejected. For example, many times two or more propagating modes are effectively excited in an energy application zone by a single frequency. If the radiating element emitting an electromagnetic wave at that frequency is positioned at a null of one of the modes (i.e. at a location wherein one of the modes has zero field), this mode may be eliminated (i.e., rejected).

The modal condition and the corresponding modal cavity (i.e. a cavity that meets the modal condition) may exhibit advantages in controlling field patterns, or more specifically, modes, in the energy application zone. As discussed above, in a modal cavity, the number of propagating modes may be fewer than that in a non-modal cavity. Therefore, control of these propagating modes may be relatively easier, for example as the number and density of antennas used to eliminate undesired modes may be lower if the modal condition is met. Moreover, minor inaccuracies in control may have a less prominent overall effect on the hot spot selection in a modal cavity than in a non-modal cavity, where a relatively higher number of modes may require finer control in order to achieve a condition in which one propagating mode is excited and others are not.

In one respect, some aspects of the invention involve selecting an MSE in order to achieve hot/cold spots according to a desired pattern in an energy application zone. The cold spots permit controlled application of energy because when it is desired to avoid applying energy to a portion of an object, a cold spot may be aligned with that portion. When it is desired to apply energy to a portion of an object, a hot spot may be aligned with that portion.

If a user desires to apply twice the amount of energy to object 66 than to object 68, the fields patterns of both FIG. 3A and FIG. 3B may be used, with the former being applied for double the amount of time at the same power level, at double the power level for the same amount of time, or for any other time/power pair that corresponds supplying twice the energy via the field pattern of FIG. 3A than via the field pattern of FIG. 3B (assuming the electromagnetic field intensity within hot spot 62 is the same as that within hot spot 64 and the properties of object 66 are similar to object 68). This can occur by simultaneously or sequentially exciting the field patterns of FIGS. 3A and 3B. If the field intensities differ in the shaded areas, the difference may be taken into account in order to achieve a desired energy application profile in the energy application zone or the object, e.g., a desired energy absorption distribution in the energy application zone or the object.

When two field patterns are excited sequentially, the time average of the field pattern formed in the energy application zone is the sum of the two excited field patterns. If the field patterns are excited simultaneously, interference may occur, and then the time average may be different from the sum. However, if the two field patterns are orthogonal to each other, as modes are, sequential and simultaneous application may have the same result.

The apparatus of FIG. 1 may be configured to control a distribution of hot and cold spots in the energy application zone, thus applying differing target amounts of energy to any two (or more) particular regions in a an energy application zone, for example, a cavity or modal cavity. Such control can occur through the selection and control of MSEs. Choices of MSE selection may impact how energy is distributed in regions of the energy application zone. When the modal condition is not met, it may be more difficult to achieve a desired energy application distribution through the control of MSEs due to the more complex mathematics sometimes needed to describe the electromagnetic field and/or more complicated control schemes required to selectively or effectively excite a desired field pattern (mode). Thus, the modal condition may be used in combination with MSE control to achieve a desired energy distribution. While the modal condition may be used in combination with MSE control, the modal condition may also provide benefits even if not used with MSE control. Conversely, MSE control may be applied even if the modal condition is not met.

In some embodiments, processor 30 may be configured to acquire information indicative of electromagnetic energy loss associated with the object. In some embodiments, "loss" associated with the object may include any electromagnetic energy that is applied to the energy application zone in the presence of the object, but is not reflected back to the transmitting radiating element and/or transmitted to another receiving element or by any other detector that detects energy leaking from the zone. In some embodiments, "loss" associated with the object may be associated or derived from the energy dissipated by the object.

In some embodiments, the "loss" associated with the object is the ability of the object to absorb energy, an ability which is sometimes indicated by an "absorption coefficient". The loss may include electromagnetic losses due to ionic conduction (denoted by $\varepsilon_\sigma''$); electromagnetic losses due to dipole rotation (denoted by $\varepsilon_d''$); and/or a combination of these or other loss components, wherein the total loss may be denoted as $\varepsilon''$ and characterized, for example, by:

$$\varepsilon''=\varepsilon_d''+\varepsilon_\sigma''=\varepsilon_d''+\sigma'/(\omega\varepsilon_0)$$

where subscripts d and σ stand for contributions of dipole rotation and ionic conduction, respectively, $\sigma'$ is the electric conductivity, $\omega$ is the angular frequency of the applied EM wave, and $\varepsilon_0$ is the permittivity of free space or vacuum. Hereinafter, as a shorthand, the total loss may be denoted by "σ". However, as used herein, the term "loss" is broadly used to encompass contributions of both $\sigma'$ and $\varepsilon_d''$, as well as other losses that may be characterized by an absorption coefficient. By way of example, if an electromagnetic energy absorbing object is located in the energy application zone, the loss may represent the electromagnetic energy absorbing ability of the object. Alternatively, the loss may represent the electromagnetic energy loss on the boundary of the energy application zone, regardless of whether there is any object located in the energy application zone.

Losses may be characterized in terms of their profiles, e.g., in terms of their spatial and/or time distribution, generally referred herein as a loss profile. The term "profile," which also may be referred to as a pattern, image, distribution, etc., may include any spatial and/or temporal distribution of loss in the energy application zone. For example, a loss profile may be a representation of any absorption coefficient as a function of location in space. For example, a loss profile may be a map, showing areas of different absorption coefficient in different colors. In another example, a loss profile may be a matrix, wherein each cell represents a volume cell in the energy application zone, and the value inside the matrix cell is a value of an absorption coefficient characterizing the medium in at volume cell.

The loss profile may be represented in various ways that convey information about the distribution of energy loss in the energy application zone. For example, the loss profile may be represented as an image, analytic expressions, a set of numbers, a table, or any other mechanism capable of reflecting a distribution of energy loss in the energy application zone or in a portion thereof.

When represented as an image or using any imaging techniques, the loss profile may include a black and white image, gray-scale image, color image, surface profile image, volumetric image, or any other graphical depiction. In graphical terms, the loss profile may be represented, for example, in one-, two-, three-, and/or four-dimensions, wherein the forth-dimension may refer to the 3D spatial loss profile over time.

When represented in tablature, the loss profile may assume the form of a table, each entry of which may contain an indication of correlation between a portion of the energy application zone and the energy absorbed at that portion.

When represented analytically, a loss profile may, for example, be written in terms of one or more equations. For example, such equations may be written as a function of one or more of time, space, power, phase, frequency, or any other variables that may be correlated to energy losses.

When represented numerically, the loss profile may be expressed as a number or a series of numbers.

Regardless of the manner of representation, a loss profile may be expressed in either digital and/or analog formats. For example, the loss profile may include a digital file stored in a memory and loadable into a processor. In another example, the loss profile may be printed on paper or film, or may be represented by a model made of physical material.

A loss profile or other information indicative of electromagnetic energy loss may be acquired by the processor in numerous ways. For example, the processor may be configured to receive the information. The information may be encoded in a machine readable element, for example, a barcode or an RFID tag, associated with the object, and the processor may be configured to obtain the information, directly or indirectly, from the machine readable element. In another example, the information may be preprogrammed in the processor. For example, the processor may be preprogrammed with information indicative of electromagnetic energy loss associated with different objects, and the processor may receive an image of the object, for example, an image acquired by a CCD associated the energy application zone, recognize the imaged object using image recognition techniques, and acquire the relevant information based on the recognized image.

In some embodiments, the processor may be configured to acquire the information by measuring electromagnetic feedback from the energy application zone (e.g., by receiving signals indicative of feedback from the object for example from a detector), and by analyzing the feedback (e.g., signals) to obtain the information. For example, the processor may be configured to receive an indication that a field pattern generated by a given MSE was absorbed particularly well by the object. The processor may be further configured to determine that the object is located in one of the high field intensity areas corresponding to that particular MSE. The more MSEs that are applied to the energy application zone, the more information the processor may obtain about the location and the absorptive properties of the object in the energy application zone. Over a series of such measurements with differing MSEs, the processor can narrow-in on the location of the object in the space and/or the spatial distribution of absorptive properties in the energy application zone, thus acquiring information indicative of electromagnetic energy loss associated with the object, portions of the object, and/or empty regions of the energy application zone. It should be noted that, as used herein, a processor can include any type of device or equipment that can be used to receive one or more signals associated with feedback and perform at least one operation based on the received signals. In some embodiments, the processor may include a computational device, such as a mainframe computer, a PC, a digital signal processor, a microprocessor, or any other type of computing device.

Figure 8:
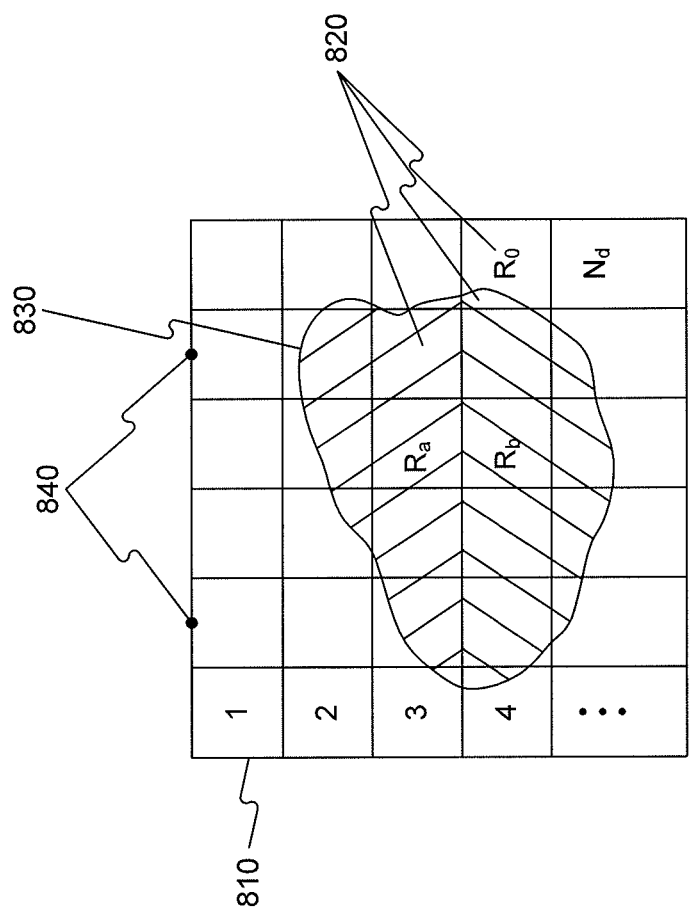
FIG. 8 represents an exemplary loss profile in accordance with some embodiments of the invention.

By way of example only, a loss profile may include a 2D image, as shown in FIG. 8. It should be understood that the 2D image shown in FIG. 8 is a simplified example for ease of discussion. The same general principles explained below with regard to the simplified 2D image are equally applicable to 3D and 4D representations. It should also be understood that in the context of 2D space, the size of the energy application zone is characterized by area instead of volume.

FIG. 8 illustrates an energy application zone 810. A loss profile 820, which may or may not have the same shape and/or size as the energy application zone, may characterize energy loss (e.g., absorption and/or dissipation) in zone 810. The loss profile 820 may reflect the spatial distribution of loss ($\sigma$) in the energy application zone 810. For example, if an object 830 is located in the energy application zone 810, loss profile 820 may reflect the energy absorption property of object 830. Additionally or alternatively, loss profile 820 may reflect the energy absorption property outside object 830. The loss profile may be obtained independently of the energy application zone, or the loss profile may be obtained by taking into account the properties of the energy application zone. In one example, the loss profile may be obtained in advance for a known object. In another example, the loss profile may be dynamically obtained for any object located in the energy application zone.

By way of example only, loss profile 820 and energy application zone 810 may be associated by superposition, registration, mapping, correlation, zooming, or any other association methods.

The loss profile of the energy application zone may be predetermined (i.e., determined beforehand). Processor 30 may be configured to determine the loss profile for any given object placed in the energy application zone. Such a determination may be accomplished, for example, by implementing a series of steps to dynamically create a loss profile. For example, the processor may first determine one or more MSEs to be applied along with a discretization strategy. Then, the processor may regulate the source to apply the selected MSEs and generate their corresponding field patterns in the energy application zone. While applying each MSE and generating the corresponding field pattern in the zone, the processor may detect feedback from the zone. For example, the processor may perform measurements of various quantities, for example incident power, reflected power, and transmitted power for each applied MSE/field pattern. Based on this feedback, a set of equations may be constructed and the processor may be configured to solve the equations to dynamically create loss profile 820. In addition or alternatively to dynamically created loss profiles, processor 30 may be configured to access any other suitable type of predetermined loss profile. For example, processor 30 may access loss profiles that are preloaded onto a system as part of a manufacturing process, generated and stored by the system as part of a calibration process, generated and stored as a result of any intermediate or operational process of the system, and/or provided to the system via a connection to an external memory unit (e.g., portable hard drive, optical disk, Internet or other data connection, memory stick, etc.).

Processor 30 may be configured to determine a weight to be applied to each of a plurality of electromagnetic field patterns each having a unique electromagnetic field intensity distribution. In some cases the unique electromagnetic field intensity distributions may be known for one or more of the corresponding plurality of electromagnetic field patterns. The terms "known electromagnetic field intensity distribution", "known field patterns", and the like, may include distributions, field patterns, etc. that are known, estimated, approximated, or associated with the field patterns or MSEs based on some features that an electromagnetic field intensity distribution and the field pattern may have in common.

Additionally or alternatively, processor 30 may be configured to determine a weight to be applied to each of a plurality of MSEs, based on known electromagnetic field intensity distributions of the field patterns excited in the energy application zone with these MSEs.

The processor may determine the weight and apply the weight to the corresponding MSE of the field pattern, thereby achieving weighted field patterns in the energy application zone. Application of the weight may be, for example, by way of determining a power level, time duration, or combination thereof, to be proportional to the weight. For example, field patterns may be applied all in the same power level, and patterns with larger weight may be applied for a longer duration. In other examples, field patterns may be applied all for the same duration, and patterns with larger weight may be applied at higher power. Still in other examples, both duration and power may change from one field pattern to another, and field patterns with larger weight may be applied at such powers and durations that the product of the power by the time duration is larger than that at which a field pattern of smaller weight is executed.

The field pattern may be a function of the physical characteristics of the energy application zone, controllable aspects of the energy source, the type, number, size, shape, configuration, orientation, location, and/or placement of the radiating elements, the presence of field altering structures such as field adjusting elements (FAEs) and/or dielectric lenses, and/or any other variable that may affect the field pattern. For any particular energy application zone, a set of known field patterns may be achieved, for example, by supplying energy to the energy application zone at different MSEs, which may differ from each other by frequency, phase, and/or amplitude of one or more energy sources; by the type, number, size, shape, configuration, orientation, location, and/or placement of one or more radiating elements; by operation of field adjusting elements, for instance, by adjustments of dielectric lenses or other field adjusting elements; or by other variable components that affect MSEs.

Different MSEs may lead to differing field patterns, which affect the distribution of energy across the energy application zone. Because an infinite number of MSEs may be available, there may be an infinite number of different field patterns and resulting energy distributions that can be achieved in a particular energy application zone. The number of different energy distribution options in practice, however, may be related to the number of MSEs and/or the number of combinations of MSEs that are practically useable.

A particular MSE may correspond to a particular field pattern. For many MSEs, their corresponding field patterns may be known or determined in advance. For example, if a set of MSEs is chosen to be applied to a rectangular energy application zone, and frequency is the only controllable variable of each MSE, then the field pattern corresponding to each MSE may be obtained by calculating equations using the dimensions of the energy application zone, frequencies of the MSEs, and other necessary parameters. Alternatively or additionally, such field patterns may be determined by conducting simulations using computer programs. Other methods including measurements (e.g., real-time measurements) may also be used to determine the field patterns corresponding to the set of MSEs. The measurements may be obtained 'on the fly', e.g., during a heating process, for example by detecting one or more inputs from one or more sensors (detectors) provided in the energy application zone. These inputs (measurements) may be used to predict an actual field pattern (e.g., the excited field pattern).

On the other hand, a particular field pattern may correspond to more than one MSE. For example, a particular field pattern may be achieved by using a single radiating element or multiple radiating elements. Further, the same field pattern may also be achieved by using more than one source with certain phase differences. Other MSEs may also be used to achieve the same field pattern. Therefore, there may be multiple choices of MSEs to generate a desired field pattern, and the selection of MSE(s) may be dependent on factors such as ease of implementation, controllability, cost, and other design considerations.

Figure 10:
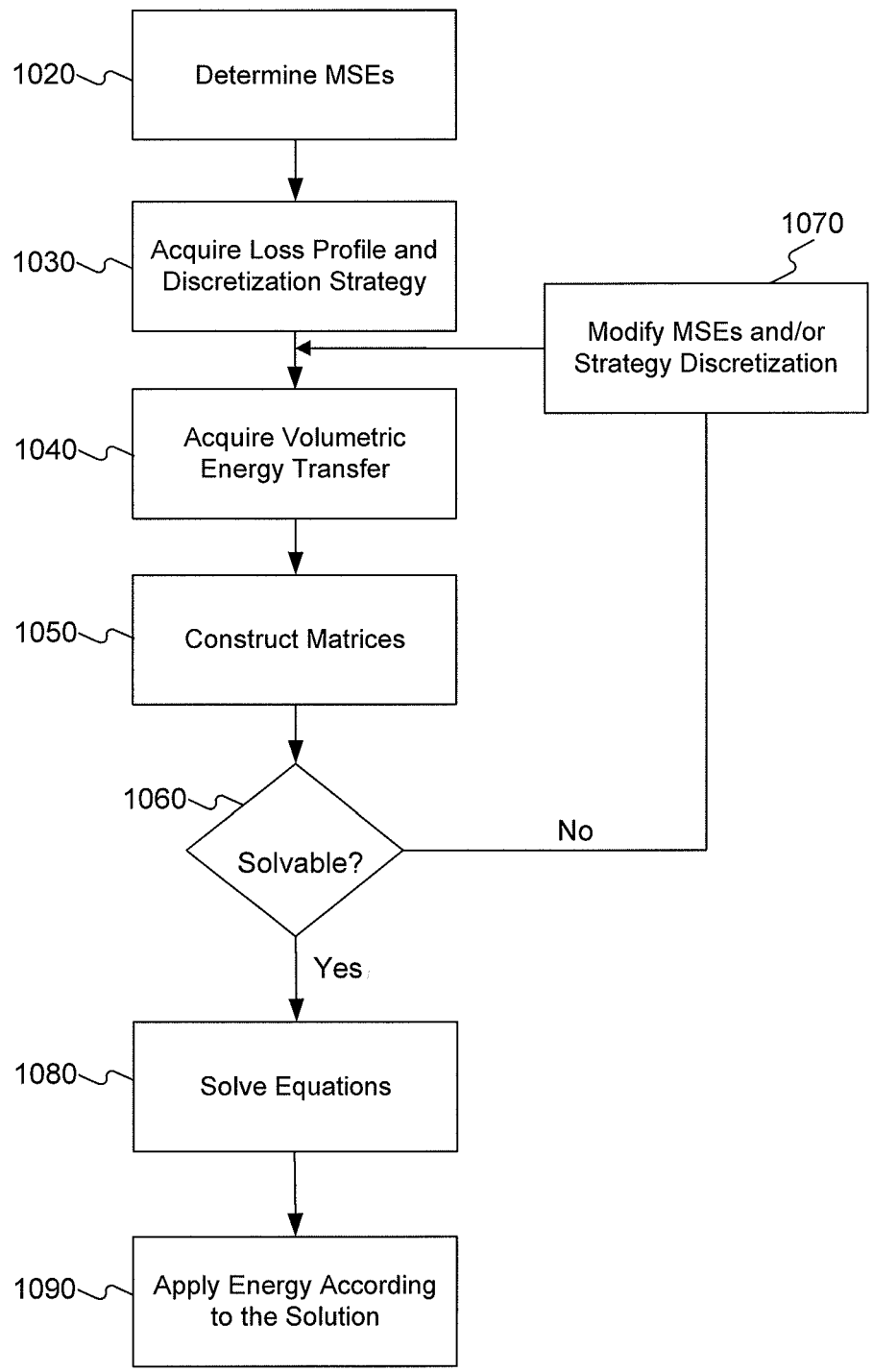
FIG. 10 is a flow chart of exemplary steps of implementing a spatially controlled energy delivery method in accordance with some embodiments of the invention.

Processor 30 may implement the steps as shown in FIG. 10 to implement a particular exemplary method for achieving spatial control over energy delivery (application). In step 1020, the processor may determine a set of MSEs to be used in the process. As discussed previously, an MSE may correlate to a known field pattern. Therefore, by determining a set of MSEs, the processor may control the source to apply electromagnetic energy to the energy application zone and generate a set of known field patterns in the zone. In some embodiments, step 1020 may be omitted, and all the available MSEs may be considered for purpose of generating a desired field pattern in the energy application zone. It may be expected that, at least in some cases, one or more of the available MSEs will be assigned negligible weights, and therefore will not be used in practice, even if step 1020 is omitted.

The method of constructing a controlled field pattern inside the energy application zone from a predetermined set of field patterns is termed as "spatial filtering." The term "filtering" refers to an ability to discriminate spatial locations and the field intensities applied to them in terms of a set of known field patterns. Because the controllable MSEs are related to the predetermined set of field patterns, it may be possible to represent any field pattern in terms of one or more MSEs, at least to some level of accuracy. As discussed previously, there may be more than one MSE available to achieve a particular field pattern. Therefore, the choice of MSE to achieve a particular field pattern may be application dependent.

Returning to step 1020, the processor may determine and implement the MSEs in a variety of ways depending of the requirements of a particular application. In one example, the processor may control the energy source to supply EM energy at a plurality of selected frequencies. In this case, frequency may serve as controllable variable that can be used to provide a desired MSE. Alternatively or additionally, the processor may control the energy source to supply EM energy in a plurality of selected amplitudes. In this case, amplitude may serve as a controllable MSE variable.

In some embodiments, an MSE is a combination of variables and it may be possible to change the MSE by altering a single variable or multiple variables. By way of a simplified example, the processor may control the energy source to supply EM energy with two frequencies: $f_1$ and $f_2$; and two amplitudes: $A_1$ and $A_2$. In this case, the available MSEs may be $[(f_1, A_1), (f_1, A_2), (f_2, A_1), (f_2, A_2)]$. That is, the processor may control the energy source to supply a first EM energy at frequency $f_1$ and amplitude $A_1$, a second EM energy with frequency $f_1$ and amplitude $A_2$; a third EM energy with frequency $f_2$ and amplitude $A_1$; and a fourth EM energy with frequency $f_2$ and amplitude $A_2$. The available MSEs can be represented in matrix form as:

$[(f_1, A_1), (f_1, A_2)$
$(f_2, A_1), (f_2, A_2)]$.

In this simple example, only two frequencies and two amplitudes are available and, therefore, the MSE matrix is a 2×2 matrix. If more frequencies and amplitudes are available, the MSE matrix may be expanded accordingly. For example, if 10 frequencies and 5 amplitudes are available, the MSE matrix may become a 10×5 matrix, with each row of the matrix having the same frequency value but different amplitude values, and each column of the matrix having the same amplitude value but different frequency values. If more or less types of controllable MSE variables are available, the dimension of the MSE matrix may be changed accordingly. For example, if the phase (P) of the EM energy is also controllable, the MSE matrix may become a 3D matrix, with each element of the matrix in a form of $(f_i, A_j, P_k)$. Here the subscripts i, j, and k represent indices of available frequency, amplitude, and phase, respectively. The size of the matrix may be represented as $N_f \times N_A \times N_P$, where $N_f$, $N_A$, and $N_P$ represent the available number of controllable frequencies, amplitudes, and phases, respectively. If only one controllable parameter is available, the matrix may degenerate to a 1D vector.

In addition to the frequency, amplitude, and phase, any controllable parameter that may effectively change the field pattern inside the energy application zone may be part of the MS. For example, the number of radiating elements for radiating (applying) EM energy to the energy application zone may constitute another controllable parameter, which corresponds to an additional dimension of the MS. In another example, the placement/location/orientation of the radiating element(s) may constitute additional dimensions of the MS. In this case, the placement/location/orientation of the radiating element(s) may be physically changed in space by mechanical, electrical, or other suitable means. Alternatively, there may be provided an array of radiating elements, and the desired placement/location/orientation may be achieved by selecting a particular radiating element or any subset of the radiating elements in the array. The placement/location/orientation of radiating element(s) may also be adjusted by any combination of the aforementioned methods. In yet another example, there may be provided a field adjusting element (FAE), such as a conducting structure, inside the energy application zone. The placement/location/orientation of the FAE may be adjusted in the similar manner as that of the radiating element. Processor 30 may be configured to select from among the full range of available MSEs and assemble a set of MSEs such that the resulting combination of field patterns may satisfy the energy application requirements of a particular application.

For any combination of MSE variables that constitutes an MSE, those variables in the combination should represent physically attainable conditions. For example, if in a given apparatus only one antenna and one source are available, and the source can only output EM waves at a single frequency, then a valid MSE cannot include more than one frequency in its MSE variables, as multiple frequencies cannot coexist in this example. Instead, an MSE in the given apparatus may include waves of the given frequency, at different phases, and/or amplitudes as its valid MSE variables. In another exemplary apparatus, two antennas and two sources (or more) are available, an MSE may include different frequencies for different antennas/sources. In this example, more than one frequency could be included among the valid MSE variables. In general, an MSE may include, among other controllable quantities and/or parameters, one or more of amplitude, phase, and frequency of the applied electromagnetic wave; a location, orientation, and configuration of each radiating element; or the combination of any of these parameters that may coexist.

MSE selection may impact how energy is distributed in regions of the energy application zone. Processor 30 may control one or more MSEs in order to achieve a field pattern that targets energy to a specific predetermined region in the energy application zone. A selection of MSEs that result in standing waves may provide an added measure of control because standing waves exhibit predictable and distinctly defined hot spots and cold spots. While use of MSEs to control energy distribution may have benefits in a non-modal cavity, a modal cavity may provide a medium especially suitable for achieving MSE control. In another example, when a phase modulator is used, it may be controlled to perform a predetermined sequence of time delays on an AC waveform (emitted by a radiating element), such that the phase of the AC waveform is increased by a number of degrees (e.g., 10 degrees) for each of a series of time periods. Alternatively or additionally, processor 30 may dynamically and/or adaptively regulate modulation based on feedback from the energy application zone. For example, processor 30 may be configured to receive an analog or digital feedback signal from detector 40, indicating an amount of electromagnetic energy received from cavity 20 (e.g., an amount of energy reflected to the transmitting radiating element and/or amount of energy transmitted to other receiving radiating element(s)), and processor 30 may dynamically determine a time delay at the phase modulator for the next time period based on the received feedback signal. The processor may also be configured to regulate a frequency modulator in order to alter a frequency of at least one electromagnetic wave supplied to the energy application zone. Such a frequency modulator may be configured to adjust the frequency of an AC waveform. By way of example, the frequency modulator may include a semiconductor oscillator, such as oscillator 22 diagrammatically depicted in FIG. 4A, configured to generate an AC waveform oscillating at a predetermined frequency. The predetermined frequency may be associated with an input voltage, current, or other analog or digital signals. For example, a voltage controlled oscillator may be configured to generate waveforms at frequencies proportional to the input voltage.

Consistent with some embodiments, processor 30 may be configured to regulate oscillator 22 to generate AC waveforms of time-varying frequencies. For example, oscillator 22 may generate a sinusoidal signal cos [ω(t)·t]. The AC signal may be amplified by amplifier 24 and cause radiating elements, e.g., antennas 32 and 34 (illustrated for example in FIG. 4A), to excite frequency modulated electromagnetic waves in cavity 20.

Processor 30 may be configured to regulate oscillator 22 to sequentially generate AC waveforms oscillating at various frequencies within a predetermined frequency band. This sequential process may be referred to as "frequency sweeping". More generally, processor 30 may be configured to regulate the source to sequentially generate waveforms at various MSEs, e.g. at various frequencies, phases, amplitudes, and/or selections of radiating elements. Such a sequential process may be referred as "MSE sweeping". Sequentially swept MSEs may not necessarily be related to each other. Rather, their MSE variables may differ significantly from MSE to MSE (or may be logically related). In some embodiments, the MSE variables may differ significantly from MSE to MSE, possibly with little or no logical relation among them, however in the aggregate, a group of working MSEs may achieve a desired energy application goal.

In such exemplary embodiments (e.g., in frequency sweeping), each frequency may be associated with a feeding scheme (e.g., a particular selection of MSEs). In some embodiments, based on the feedback signal provided by detector 40, processor 30 may be configured to select one or more frequencies from the frequency band, and regulate oscillator 22 to sequentially generate AC waveforms at these selected frequencies.

Alternatively or additionally, processor 30 may be further configured to regulate amplifier 24 to adjust amounts of energy delivered via antennas 32 and 34, based on the feedback signal. Consistent with some embodiments, detector 40 may detect an amount of energy reflected from the energy application zone at a particular frequency, and processor 30 may be configured to cause the amount of energy delivered at that frequency to be high when the reflected energy is high. That is, processor 30 may be configured to cause one or more radiating elements to deliver energy at a particular frequency over a longer duration when the reflected energy is high at that frequency. For example, when the reflected energy measured indicates that a certain frequency is absorbed relatively poorly in the object, it may be desirable to apply more energy at that frequency to compensate for the poor absorption. Alternatively or additionally, processor 30 may be configured to cause one or more radiating elements to apply energy at a particular frequency over a longer duration when the reflected energy is low at that frequency. Other relationships between amounts of reflected and applied energy may also be used.

Figure 4A:
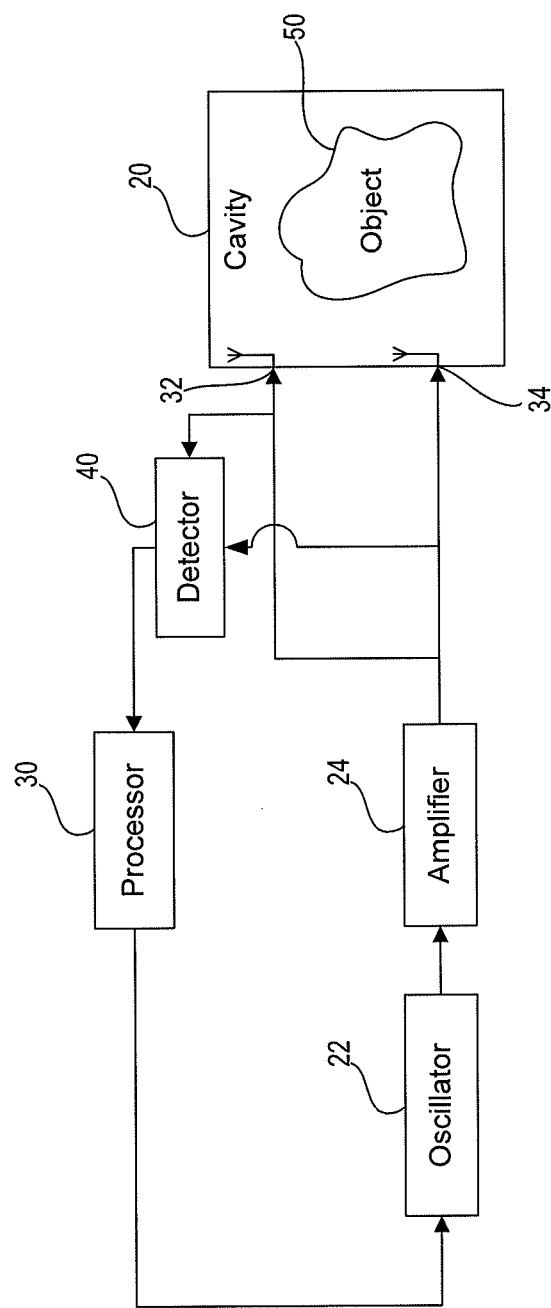
FIG. 4A provides a diagrammatic representation of an apparatus configured to perform frequency modulation on electromagnetic waves supplied to an energy application zone, in accordance with some exemplary embodiments of the invention.
Figure 4B:
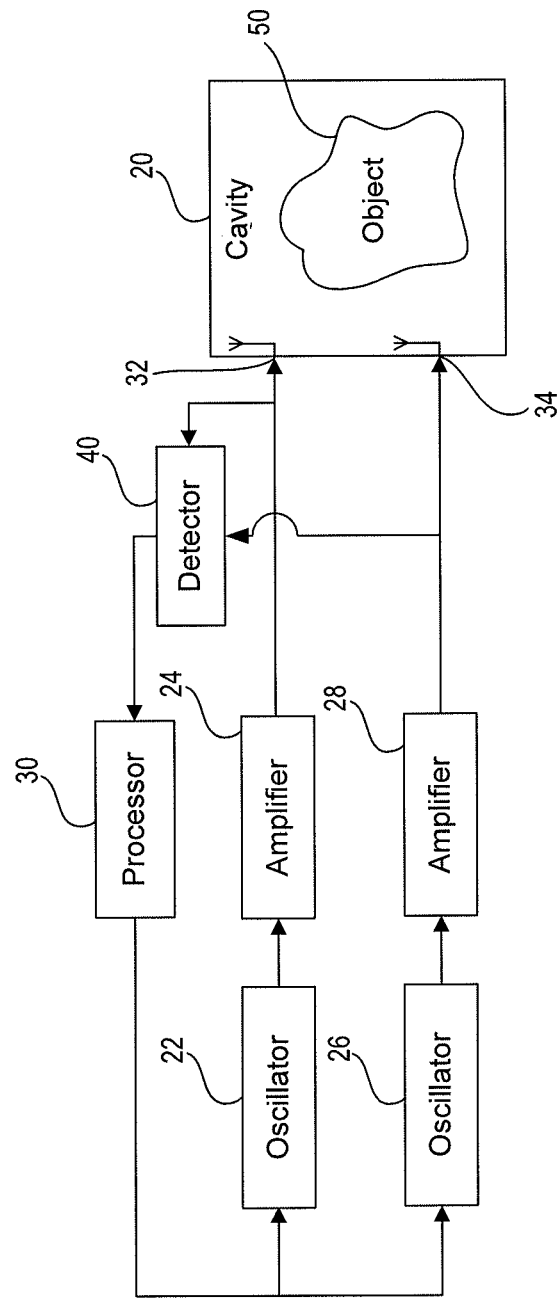
FIG. 4B provides another diagrammatic representation of an apparatus configured to perform frequency modulation on electromagnetic waves supplied to an energy application zone, in accordance with some exemplary embodiments of the invention.

As depicted in FIG. 4B, some embodiments of the invention may include a source with more than one EM energy generating component, such as oscillators 22 and 26 for generating AC waveforms of differing frequencies. The separately generated AC waveforms may be amplified by amplifiers 24 and 28, respectively. Accordingly, at any given time, antennas 32 and 34 may be caused to simultaneously apply electromagnetic waves at two differing frequencies to cavity 20. One or both of these two frequencies may be time-varying. FIG. 4B illustrates two oscillators for exemplary purposes only, and it is contemplated that within the scope of the invention more than two oscillators (and/or more than two amplifiers and/or more than two antennas) may be used.

Figure 5:
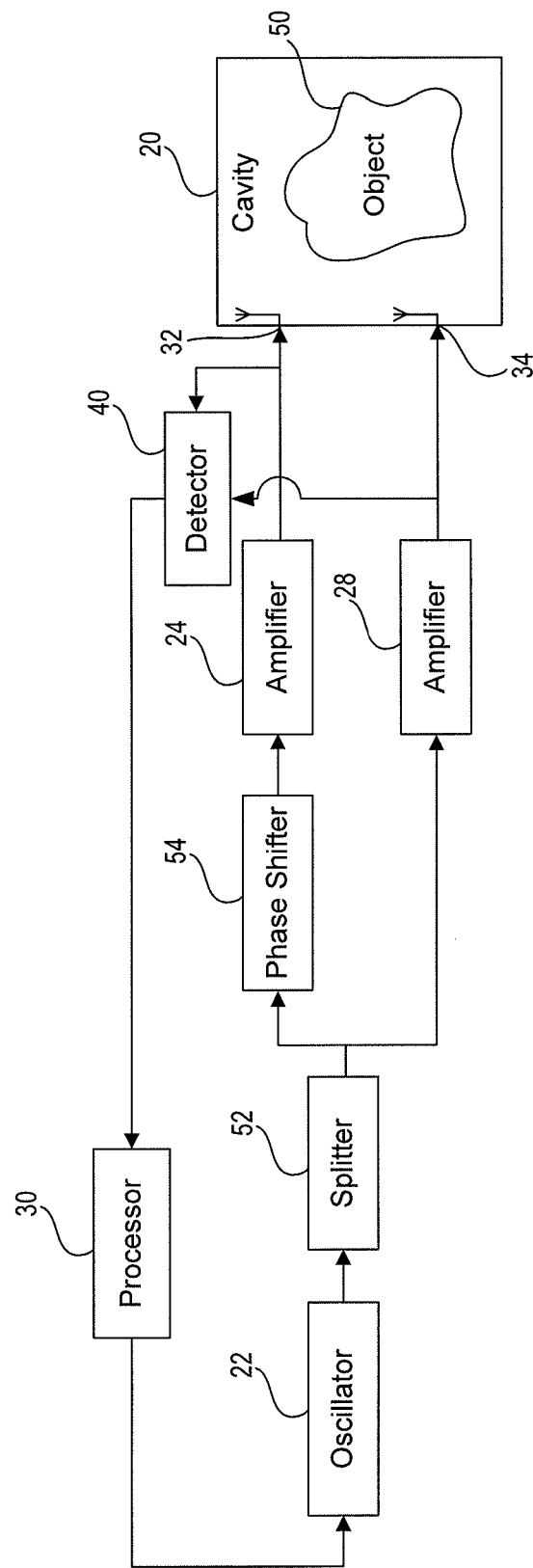
FIG. 5 provides a diagrammatic representation of an apparatus configured to perform phase modulation on electromagnetic waves supplied to an energy application zone, in accordance with some exemplary embodiments of the invention.

Processor 30 may be configured to regulate a phase modulator in order to alter a phase difference between two electromagnetic waves supplied to the energy application zone. By way of example, the phase modulator may include a phase shifter, such as phase shifter 54, as illustrated in FIG. 5. Phase shifter 54 may be configured to cause a time delay in the AC waveform in a controllable manner within cavity 20, delaying the phase of an AC waveform anywhere from between 0-360 degrees. Phase shifter 54 may include an analog phase shifter configured to provide a continuously variable phase shift or time delay, or phase shifter 54 may include a digital phase shifter configured to provide a discrete set of phase shifts or time delays.

A splitter 52 may be provided to split the AC signal generated by oscillator 22 into two AC signals (e.g., split signals). Processor 30 may be configured to regulate phase shifter 54 to sequentially cause various time delays such that the phase difference between the two split signals may vary over time. This sequential process may be referred to as "phase sweeping."

In general, processor 30 may sweep various parameters, alternatively or additionally to the above-described frequency sweeping and phase sweeping, to perform MSE sweeping. MSE sweeping may include sequential change of any parameter that affects the field pattern generated in the energy application zone.

Processor 30 may be configured to regulate an amplitude modulator in order to alter an amplitude of at least one electromagnetic wave supplied to the energy application zone. By way of example, the amplitude modulator may include a mixer circuit, e.g., mixer 42 illustrated in FIG. 6A, configured to regulate an amplitude of a carrier wave with another modulating signal. For example, oscillator 22 may be configured to generate a higher frequency AC signal, and oscillator 26 may be configured to generate a lower frequency AC signal. The two AC signals may be mixed by mixer 42 into one AC signal oscillating at the higher frequency, and the amplitude of the mixed AC signal may vary according to the lower frequency AC signal. For example, if the higher frequency signal is a sinusoidal signal cos [$\omega_1 \cdot t$] and the lower frequency signal is another sinusoidal signal cos [$\omega_2 \cdot t$], then the mixed signal may become cos [$\omega_1 \cdot t$] cos [$\omega_2 \cdot t$]. The mixed signal may then be amplified by amplifier 44 so that antennas 32 and 34 may radiate electromagnetic waves in the amplified waveform.

Figure 6A:
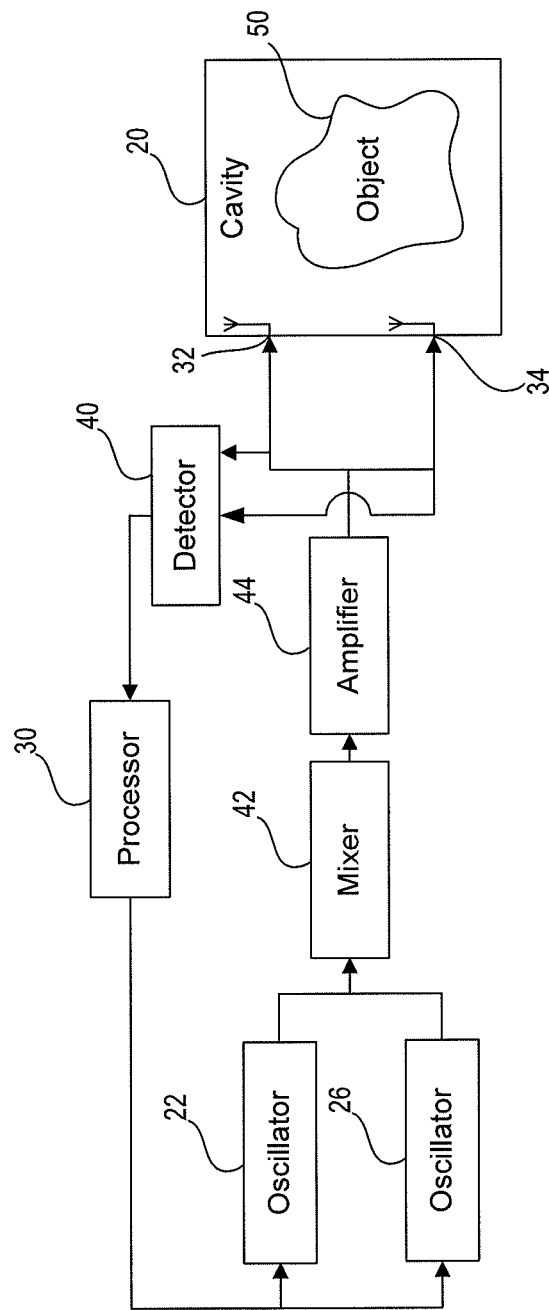
FIG. 6A provides a diagrammatic representation of an apparatus configured to perform amplitude modulation on electromagnetic waves supplied to an energy application zone, in accordance with some exemplary embodiments of the invention.
Figure 6B:
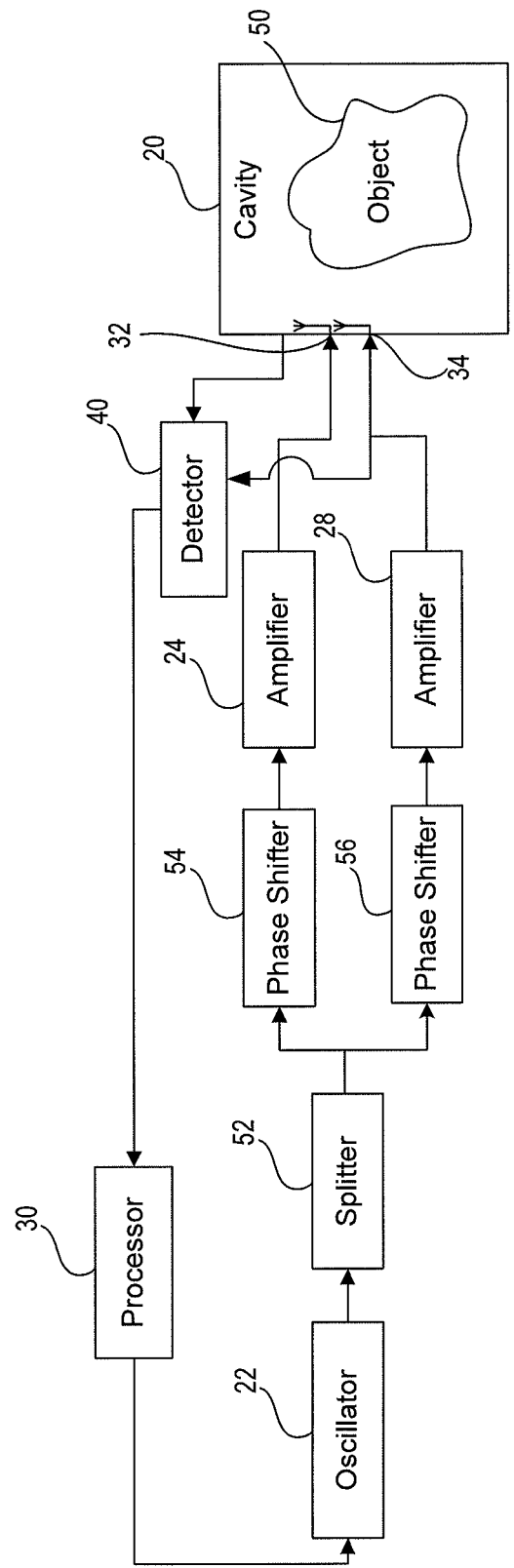
FIG. 6B provides another diagrammatic representation of an apparatus configured to perform amplitude modulation on electromagnetic waves supplied to an energy application zone, in accordance with some embodiments of the invention.

Consistent with some embodiments, the amplitude modulator may include one or more phase shifters, such as phase shifters 54 and 56, as shown in FIG. 6B. In accordance with some embodiments of the invention, amplitude modulation may be implemented by combining two or more phase shifted electromagnetic waves. For example, splitter 52 may split the AC signal generated by oscillator 22 into two AC signals, for example sinusoidal waves cos [ωt]. Because they are split from a single signal, the two split AC signals may share substantially the same frequencies. One split AC signal may be shifted by phase shifter 54 for phase α, so that the AC signal becomes cos [ωt+α]. The other split AC signal may be shifted by phase shifter 56 for phase −α (or equivalently 360°−α), so that the AC signal becomes cos [ωt−α].

As illustrated in FIG. 6B, the phased shifted AC signals may be amplified by amplifiers 24 and 28 respectively, and in this manner, antennas 32 and 34 may be caused to excite electromagnetic waves having a shared AC waveform. Antennas 32 and 34 may be positioned a predetermined distance from each other so that the two electromagnetic waves excited by the antennas may form an amplitude modulated wave, according to the trigonometric identity cos [ωt−α]+cos [ωt+α]=2 cos(α) cos(ωt). As with the other examples provided, FIG. 6B is exemplary only, as one, two, or more phase shifters can be employed depending on the requirements of a particular application.

Although FIGS. 4A-4B, 5, and 6A-6B illustrate circuits for altering frequency, phase, and amplitude modulations individually, components of these circuits may be combined in order to enable multiple MSE variable combinations. Moreover, a plurality of radiating elements may be employed, and the processor may select combinations of MSEs through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. Alternatively or additionally, amplitude may be held constant and field changes may be caused by switching between radiating elements. Further, radiating elements 32 and 34 may include a device that causes their location or orientation to change, thereby causing field pattern changes. The combinations are virtually limitless, and the invention is not limited to any particular combination, but rather reflects the notion that field patterns may be altered by altering one or more MSEs.

Although changes in MSE selection may result in significant changes in field patterns, field patterns corresponding to a given set of MSEs may be predictable. The field patterns that result from any particular set of MSEs may be determined, for example, through testing, simulation, or analytical calculation. Using the testing approach, sensors (e.g., small antennas) can be placed in an energy application zone to measure the electromagnetic field distributions that result from a given set of MSEs. The field patterns can then be stored in, for example, a look-up table. The testing approach may be conducted in factory or on site. In a simulated approach, a virtual model may be constructed so that field patterns corresponding to a set of MSEs can be tested in a virtual manner. For example, a simulation model of an energy application zone may be performed in a computer based on a set of MSEs inputted to the computer program. A simulation engine such as CST or HFSS may be used to numerically calculate the field distribution inside the energy application zone for any given MSE, e.g., based on the inputs provided. The resulting field pattern may be visualized using imaging techniques or stored in a computer as digital data. The correlation between MSE and resulting field pattern may be established in this manner. This simulated approach can occur in advance, and the known field patterns may be stored in a look-up table. Alternatively or additionally, the simulation can be conducted on an as-needed basis during an energy application operation.

As an alternative or addition to testing and simulation, calculations may be performed based on an analytical model in order to predict field patterns based on selected set of MSEs. For example, given the shape of an energy application zone with known dimensions, the basic field pattern corresponding to a particular MSE may be calculated from analytical equations. As with the simulated approach, the analytical approach may occur in advance, and the known field patterns may be stored in a look-up table. Additionally or alternatively, the analytical approach may be conducted on an as-needed basis during an energy application operation.

Returning to FIG. 10, as shown in step 1030, processor 30 may acquire a loss profile of the energy application zone. In some embodiments, the loss profile may be pre-determined. The loss profile may be stored in a memory unit and acquired by the processor by reading the stored profile from the memory unit. For example, if the energy application zone is dedicated for applying energy to a known object, the loss profile of the object may be acquired by pre-measurement, simulation, or calculation. Additionally or alternatively, the loss profile may be dynamically determined by the processor, as discussed in previous sections. For example, an initial loss profile may be acquired by pre-measurement; and during processing, updated loss profiles may be dynamically determined. In addition to acquiring a loss profile, step 1030 may also include a sub-step to determine discretization strategy. If the loss profile includes discretization information of the energy application zone, the processor may use the same discretization strategy as the loss profile.

Alternatively, the processor may determine a different discretization strategy. For example, in step 1030, the processor may be configured to determine a discretization strategy to divide the energy application zone into a plurality of regions. The term discretization may refer to any division, separation, and/or partitioning of the energy application zone or a representation thereof into regions. The discretization of the energy application zone into regions may be predetermined. In one case, the processor may acquire the predetermined discretization information, through, for example, a look up table, information stored in memory, or information encoded in the processor. Alternatively or additionally, discretization may occur dynamically. For example, an initial discretization may be predetermined, and changed dynamically, for instance, to improve the stability of a solution of a set of equations.

In some embodiments, the discretization may be in a predetermined manner, for instance, denser at the center of a tray positioned in the energy application zone, where an object is likely to be positioned, and sparser near the edges of the energy application zone. In some embodiments, discretization may be in accordance with information about the object, for example, in accordance with the following logic. At first, the processor may receive, for example, from a user, information regarding positions of objects within the energy application zone, and the spatial distribution of their dielectric property, for example, a given volume is occupied by water, and in another location there is a piece of bread. Each volume characterized by essentially uniform dielectric properties (in the above example the water or the bread) may be defined as one region for purpose of discretization. At times, an object of uniform dielectric properties and irregular shape is discretized to several regions, each with a more regular shape. Alternatively or additionally, the discretization may be set in accordance with the amount of energy to be applied to different regions. For example, if a temperature gradient is required along a given volume, this volume may be discretized to many regions, to facilitate designing a combination of MSEs that result in the required temperature gradient. Additionally or alternatively, the discretization strategy is chosen considering the required computation time and/or the accuracy and reliability required by the user, and/or the stability of the mathematical solution of equations 4 and/or 5 below. For example, too large a number of discrete regions might reduce the stability of the mathematical solution. On the other hand, if the number of discrete regions is too small, it may be impossible to find a solution at all. In some embodiments, the processor starts with a first discretization scheme where the number of regions is minimal, and if solution is found to be impossible, the number of regions may be increased. If a solution is possible, the equations are solved. If the solution is not sufficiently accurate (for example, the differences between the obtained energies and the target energies is close to the upper allowed limit), discretization to more regions may be tried. Alternatively or additionally to the number of regions, in some embodiments the processor may be configured to change the shape and/or location of borders between regions. It is noted that if a given set of equations is found not solvable, alternatively or additionally to changing the discretization strategy or scheme, other options may exist. For example, deleting an equation that has a major contribution to the instability but has small contribution to the solution, and other methods known per se in the art of solving sets of linear equations numerically.

To further illustrate the discretization principle, energy application zone 810 in FIG. 8 may be divided in such a manner that object 830 occupies a single region. In another example, energy application zone 810 may be divided in such a manner that object 830 occupies multiple regions, as shown in FIG. 8. The discretization strategy may depend on many factors, including but not limited to a desired resolution, properties of the loss profile, and/or available field patterns.

In some embodiments, a resolution of the different regions (for example, to which different amounts of energy are applied) and/or a resolution of a discretization of the zone (e.g., the zone may be divided into a plurality of regions) may be a fraction of the wavelength of the applied EM energy, e.g., on the order of $\lambda/10$, $\lambda/5$, $\lambda/2$. For example, for 900 MHz, the corresponding wavelength ($\lambda$) in air ($\varepsilon=1$) is 33.3 cm and the resolution may be on the order of 3 cm, e.g., $(3 \text{ cm})^3$ or $1 \text{ (mm)}^3$ resolution. In water, for example, the wavelength is approximately 9 times shorter at the same frequency (900 MHz), thus the resolution may be in the order of 0.33 cm, e.g., $(0.33 \text{ cm})^3$. In meat, for example, the wavelength corresponding to frequency of 900 MHz is about 7 times shorter than in air and the resolution may be in the order of 0.4 cm, e.g., $(0.4 \text{ cm})^3$. Using higher frequencies may allow for higher resolution. For example, in other frequencies, the resolution may be in the order of: 0.1 cm, 0.05 cm, 0.01 cm, 5 mm, 1 mm, 0.5 mm, 0.1 mm, 0.05 mm or less.

For example, if the size of object 830 is $S_L$ (a.u.), and a desired resolution may require the object to include at least 100 regions, then the average size of each region may be, for example, $S_L/100$. The size of different regions may or may not be the same. In certain locations of the object, the size of the divided regions may be smaller than in other locations. In other words, the density of regions may vary across the entire object.

Figure 7A:
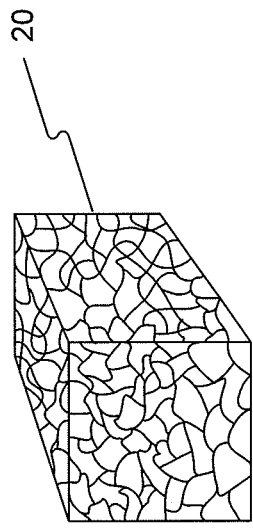
FIGS. 7A-7C illustrate exemplary energy application zone discretization strategies in accordance with exemplary embodiments of the invention.
Figure 7B:
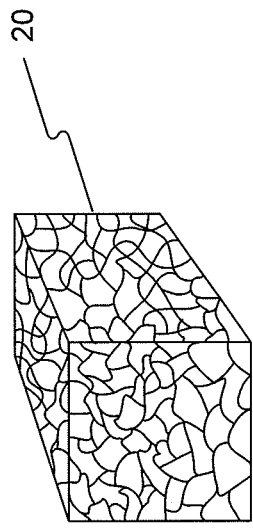
Figure 7C:
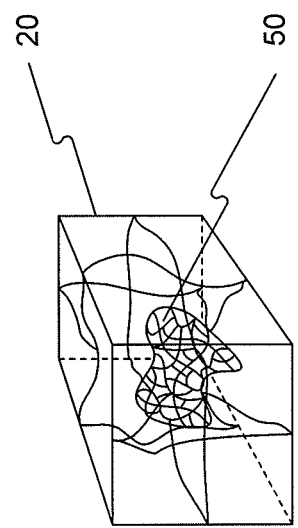

For example, the dividing strategy may vary depending on whether a region corresponds to a portion of an object in the energy application zone that is targeted for energy application; whether the region corresponds to a region of the zone where no portion of the object is located; or to a region comprising a portion of the object that is not targeted for energy application (each of the two latter regions may be termed as "void zones"). For example, in one optional strategy, the entire void zone may be treated as a single region. In another exemplary strategy, the void zone may be divided into a plurality of regions in a similar manner as inside the object. In this case, the dividing may be carried out in the entire energy application zone, regardless of the spatial occupation of the object. Alternatively, the dividing may be carried out separately for the zone occupied by the object and the void zone. In yet another example, the void zone may be divided into a plurality of regions in a different manner than that in the object. For example, the average size of regions in the void zone may be larger than that inside the object. In other words, the density of regions in the void zone may be lower than that inside the object (e.g., object 50). As illustrated in FIG. 7C, the discretization is denser in the object but sparser in the void space. The regions may be of a regular or irregular shape. For example, in 3D cases, the regions may be regular cubic- or rectangular-shaped, as illustrated in FIG. 7A. Alternatively, the regions may include any irregular-shape depending on particular needs. For example, the energy application zone may be divided into somewhat random regions as shown in FIG. 7B.

While the discussion above describes examples of discretization strategies that may be employed, any suitable discretization strategy can be used. A discretization strategy in accordance with some embodiments of the invention, for example, may include any suitable method for causing the processor to represent the energy application zone as multiple regions, regardless of whether those regions are uniform in size or shape, and regardless of whether the discretization results in any recognizable pattern.

An exemplary process for constructing a loss profile is discussed below in connection with FIG. 8, where energy application zone 810 may be divided into multiple regions, with each region having substantially the same regular squared shape. However, it is contemplated that the method described below may be applied to discretizations where zone 810 is divided into regions of irregular shapes and/or unequal sizes. The regions may be labeled from the upper left corner to lower right corner as 1, 2, 3, . . . , $N_d$. Object 830, which may occupy multiple regions, e.g., regions $R_a$ and $R_b$, may include two kinds of materials having differing loss parameters $\sigma_a$ and $\sigma_b$. The void region $R_0$, which is outside the object but inside the energy application zone, has the loss parameter $\sigma_0$. The objective of the process is to create a loss profile of energy application zone 810 that approximates the real loss profile characterized by $\sigma_a$, $\sigma_b$, and $\sigma_0$. To achieve this objective, the processor assigns each region (1 to $N_d$) an unknown loss parameter $\sigma_i$ (i=1, 2, 3, . . . , $N_d$). Such discretized $\sigma_i$ is a numerical representation of the real loss profile with a resolution characterized by $N_d$. For example, if $N_d$ is large, there may be a large number of regions inside the energy application zone, and the size of each region may be small.

In FIG. 8, there may be provided two radiating elements 840 (for example antennas) to apply EM energy to energy application zone 810. In some embodiments, the MSEs determined in step 1020 are, for example, phase differences between two radiating elements 840, and the MSEs are represented by $[\theta_1, \theta_2, \ldots \theta_{Nm}]$. The same notation may be used also for any other kind of MSE. As discussed earlier, each MSE may correspond to a known field pattern inside the energy application zone (e.g., zone 810). Because the energy application zone has been discretized into $N_d$ regions, for each MSE $\theta_j$, a corresponding known field pattern may be represented by a series of local electrical field intensities $[I_{1j}, I_{2j}, I_{3j}, \ldots, I_{Ndj}]$. The electrical field intensity at a particular region of the zone is proportional to the square of the electrical field amplitude at that region. For all MSEs, the field patterns may be collectively written in matrix form as:

$$[I_{11}, I_{21}, I_{31}, \ldots, I_{Nd1};$$
$$I_{12}, I_{22}, I_{32}, \ldots, I_{Nd2};$$
$$\ldots$$
$$I_{1Nm}, I_{2Nm}, I_{3Nm}, \ldots, I_{NdNm}]$$

This matrix, referred to as the I matrix, may be determined after the MSEs and the discretization approach are determined. If discretization changes, the values of the I matrix may change, even if the field patterns remain the same.

In some embodiments, the processor may be configured to determine a weight to be applied to each of a plurality of electromagnetic field patterns, through the control of MSEs. For example, as shown in step 1040 of FIG. 10, the processor may acquire the desired amount of energy to be delivered to or absorbed in at least one region in the energy application zone, generally referred to herein as volumetric energy transfer information W. Such information may be predetermined, dynamically determined by the processor for a particular goal, and/or input by a user of the apparatus. The term "volumetric," as used herein refers to any characteristic that could depend, for example, on more than one spatial dimension. For example, "volumetric" may refer to a characteristic related to a three-dimensional space, whether physically bounded or unbounded, associated with the energy application zone. Thus, as introduced above, volumetric energy transfer information W may refer to a three dimensional spatial energy distribution profile corresponding to a desired amount of energy to be delivered or absorbed over a volumetric region of the energy application zone.

The volumetric energy transfer information may include the desired amount of energy to be transferred to and/or absorbed in at least one region in the energy application zone. For example, a user may determine to transfer energy of 100 Joules to the meat portion of a sandwich, and 20 Joules to the bread portion of the sandwich. In order to implement this desired energy application pattern, the user may select a spatial location from an image of the energy application zone, a list of different spatial locations, or by any other means capable of specifying volumetric locations. The user may then specify the amount of energy to be delivered to each specified region, through any interface to the apparatus. After the processor acquires the volumetric energy transfer information, the processor may construct matrices based on such information, as shown in step 1050 of FIG. 10. For example, the processor may construct an I matrix, as discussed previously, based on the discretization and the field patterns associated with the MSEs. The processor may further determine another matrix based on the I matrix and loss profile, hereinafter termed as "P matrix." The P matrix may be constructed as follows:

$$P = \sigma I,$$

where σ is the loss profile. Because the energy absorbed in a region depends on the field intensity and on the loss at the region, the P matrix may represent the amount of energy absorbed in each region when each MSE is applied. The volumetric energy transfer information W may represent a target distribution of absorbed energy, specifying an amount of energy is to be absorbed by at least one region in the energy application zone as a result of the energy transfer (application). The desired result represented by W may be achieved by a combination of selected MSEs. Therefore, the processor may determine a weight vector T representing the contribution of each MSE to an energy delivery scheme that may result in the desired energy transfer (e.g., volumetric energy transfer information W). Thus, the relationship between the weights of each field pattern or corresponding MSE (T), the energy absorption associated with each field pattern or corresponding MSE (P) and the desired energy transfer (W) may be expressed as W=TP. The weight may be calculated from this equation as follows:

$$T = WP^{-1},$$

where $P^{-1}$ represents the inversion of the P matrix.

After the matrices are constructed, the method may include a step of checking if the matrices represent solvable equations (step 1060). If so (1060: yes), the method may include solving the equations (step 1080), and applying energy to the energy application zone in accordance with the solution, for example, applying energy at the different MSEs, weighted according to the weights found by solving the equations (step 1090). If the equations are not solvable, for example, if a solution does not exist or is not sufficiently stable, (step 1060: no), the method may include modifying the MSEs that participate in the solution and/or the discretization applied (step 1070), and control may return to step 1040 with the new MSEs and/or discretization.

The weight T, which may be found by solving the equations, may represent, for example, the time duration of energy application, the power of energy application, or some other energy application characteristic that may dictate the contribution of each MSE to the desired result. For example, if the power to be applied at each MSE is substantially the same, energy application duration may be dictated by the weight. For example, if a first MSE is assigned a weight that is twice as large as the weight of a second MSE, the first MSE may be applied for twice the time than the second MSE.

In another example, if the time duration of applying each MSE is substantially the same, the weight may correspond to the power level during each energy application period. For example, if a first MSE is assigned a weight that is twice as large as the weight of a second MSE, the first MSE may be applied at twice the power than the second MSE.

In yet another example, if a first MSE is assigned a weight that is three times as large as the weight of a second MSE, the first MSE may be applied for twice the time and at 150% of the power at which the second MSE is applied. Thus, the weight may correspond to a power level. Additionally or alternatively, the weight may correspond to a time duration.

Application of each of the MSEs at the determined weight may be referred to herein as an energy application scheme or energy delivery scheme.

The processor may be configured to implement the energy delivery scheme, that is, to cause the source to supply each of the plurality of electromagnetic field patterns to the energy application zone at the determined weights. As discussed previously, the processor may control the application of MSEs to cause their corresponding field patterns to be generated in the energy application zone. Such field patterns may contain hot and cold spots as previously discussed. Because of the correlation between a particular MSE and its corresponding field pattern, the properties of the field pattern, including its hot and cold spots, are predictable. In a particular example, the location and field intensity of the hot and cold spots are predictable for a given MSE. With such knowledge of the field patterns, the processor may apply energy to an object in a controllable manner.

Figure 9A:
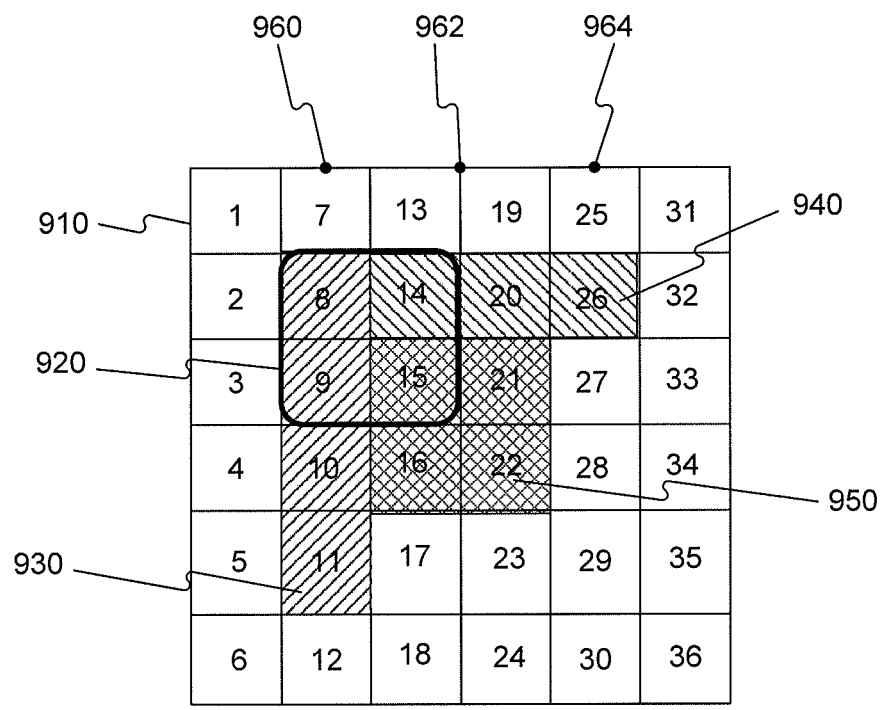
FIGS. 9A and 9B represent exemplary spatially controlled energy delivery methods in accordance with some embodiments of the invention.
Figure 9B:
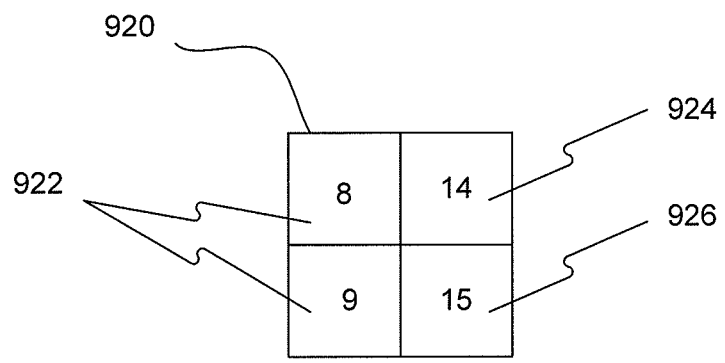

FIGS. 9A and 9B illustrate an example of spatially controlled energy delivery. In FIG. 9A, an energy application zone 910 may be discretized into a set of regions, labeled from 1 to 36. Three radiating elements 960, 962, and 964 may be placed on the boundary of energy application zone 910. An object 920 is located in the zone, occupying regions 8, 9, 14, and 15. Three field patterns may be generated by applying appropriate MSEs. The first field pattern may include a hot spot 930, located in regions 8, 9, 10, and 11 (shaded area marked by lines going from upper right to lower left). The second field pattern may include a hot spot 940, located in regions 14, 20, and 26 (shaded area marked by lines going from upper left to lower right). The third field pattern may include a hot spot 950, located in regions 15, 16, 21, and 22 (shaded area marked by crossed lines). It should be understood that the illustration of FIG. 9A is a highly simplified representation of an exemplary application of principles consistent with the present invention. In practice, the discretization of the application zone may include less or many more regions, and the size of different regions may be different. Also, in practice, the energy application zone may be three-dimensional. A two-dimensional example is provided for simplicity of representation. The regions may be of irregular shapes, and may be labeled or identified differently. An object may be located in one or more regions, and may also only partially occupy some regions. The field patterns may include one or more hot spots, each of which may be located in one or more regions, or they may be located only partially in some regions. The hot spots of different field patterns may be overlapped entirely or partially with each other. There may be different number of radiating elements, and they may be located at different locations inside, partially inside, or outside of the energy application zone.

For simplicity, it is assumed that in FIG. 9A, the first field pattern (including hot spot 930) is generated by applying electromagnetic energy through radiating element 960. Likewise, the second and third field pattern (including hot spots 940 and 950, respectively) are generated by applying electromagnetic energy through radiating elements 962 and 964, respectively. Therefore, the processor may choose to generate hot spot 930 by causing the source to supply electromagnetic energy through radiating element 960 into the energy application zone; generate hot spot 940 by causing the source to supply electromagnetic energy through radiating element 962; and generate hot spot 950 by causing the source to supply electromagnetic energy through radiating element 964.

The information indicative of electromagnetic energy loss associated with object 920 may be acquired through any available method discussed previously. For example, as shown in FIG. 9B, object 920 may include three parts: 922, 924, and 926. Part 922 may be located in regions 8 and 9; part 924 may be located in region 14; and part 926 may be located in region 15. The three parts may have different loss properties, which may be denoted by $\sigma_{922}$, $\sigma_{924}$, and $\sigma_{926}$, respectively. For simplicity, it is assumed that the three parts have the same loss property, e.g., $\sigma_{920}$.

Hot spots 930, 940, and 950 may have different field intensities. In reality, the field intensity is a function of spatial location, and it is often non-uniform, even inside a hot/cold spot. Indeed, due to standing wave phenomenon, the amplitudes of the field intensity, in other words, the envelop of the maximum field intensities, in an energy application zone often vary from a local maxima to a local minima. Such variation often has a sinusoidal shape. That is, the amplitudes of the field intensity are continuously changing from one location to another. Therefore, a hot spot may often be defined as a spatial region where all the amplitudes of field intensity inside the region are above a threshold, while a cold spot may be defined as a spatial region where all the amplitudes of field intensity inside the region are below a threshold. It should be understood that inside a hot/cold spot, the amplitudes of field intensity at different locations are not necessarily the same. However, for simplicity and ease of discussion, it is assumed that in FIG. 9A, the amplitudes of field intensities inside all three hot spots 930, 940, and 950 are the same when supplying the same power to their corresponding excitation radiating element, and increase/decrease linearly as the power supplied to their corresponding excitation radiating element changes.

The present invention may make it possible to apply a desired amount of energy to a particular part of the object within some spatial or energy error tolerance. There are virtually an infinite number of energy delivery schemes for specifying how much energy to be applied to which parts of the object. For simplicity, it is assumed that the energy delivery plan is to achieve uniform energy delivery to object 920. In other words, the plan is to deliver the same amount of energy to each of the regions 8, 9, 14, and 15 of the object. To achieve this goal, the processor may first determine the power to be supplied to each of radiating elements 960, 962, and 964. Because the assumptions are that the loss properties of all three parts of the object 920 are the same, and the amplitude of field intensities inside all three hot spots 930, 940, and 950 are also the same when supplying the same power to their corresponding excitation radiating element, the processor determines that in order to achieve uniform energy delivery, the power supplied to the radiating elements should be the same as well. That is, the weights to be applied to the field patterns should be the same. The processor may then cause the source to supply power $P_{960}$ for time duration $t_{960}$ to radiating element 960 to generate the first field pattern in which electromagnetic energy is delivered to the part 922 of the object 920 through hot spot 930. After that, the processor may supply power $P_{962}$ for time duration $t_{962}$ to radiating element 962 to generate the second field pattern in which electromagnetic energy is delivered to part 924 of the object 920 through hot spot 940. Finally, the processor may supply power $P_{964}$ for time duration $t_{964}$ to radiating element 964 to generate the third field pattern in which electromagnetic energy is delivered to the part 926 of the object 920 through hot spot 950. In the above process, when the power levels $P_{960}=P_{962}=P_{964}$ and $t_{960}=t_{962}=t_{964}$, the amounts of energy delivered to the locations 8, 9, 14, and 15 of the object are the same.

In another example, if the delivery plan is to deliver twice the amount of energy to part 922 (occupying regions 8 and 9) that is delivered equally to parts 924 and 926, the processor may double the power level $P_{960}=2 \times P_{962}$ and keep the power levels $P_{962}=P_{964}$. The time durations, however, remain unchanged. Alternatively, the processor may keep all the power levels unchanged and prolong the energy supplying duration to be $t_{960}=2 \times t_{962}=2 \times t_{964}$. Still alternatively, the processor may control the radiating elements such that $P_{960}=1.5P_{962}=1.5P_{964}$ and $t_{960}=1.333t_{962}=0.333t_{964}$. Any other way may also be used to ascertain that the amount of energy delivered to part 922 is twice the amounts of energy delivered to parts 924 and 926, and the amounts of energy delivered to parts 924 and 926 are the same.

In some embodiments, the discretization of the energy application zone may be different from the one shown in FIGS. 9A and 9B. For example, object 920 may be discretized into a plurality of regions (e.g., three), where regions 8 and 9 shown in FIG. 9B may be united as a single region. In this case, part 922, which has the same loss properties across original regions 8 and 9, may occupy a single region (8+9).

In some embodiments, hot spots in the energy application zone may overlap with one another. For example, hot spots 930 and 940 in FIG. 9A may overlap with each other in region 8. In this case, the energy delivery control strategy may be different. For example, such a distribution of hot spots may be particularly suitable for delivering more energy to region 8, because region 8 may receive energy deposition when both hot spots 930 and 940 are applied. Alternatively or additionally, such hot spots may be used to compensate the field intensity non-uniformity within each hot spot. For example, region 8 in hot spot 930 may have a lower amplitude of field intensity than that in region 9. Similarly, region 8 in hot spot 940 may also have a lower amplitude of field intensity than that in region 14. Therefore, by applying additional energy in region 8 during application of 930 and 940, such non-uniformity in the amplitude of field intensity in hot spots 930 and 940 may be compensated and uniform energy delivery may be achieved in object 920. Based on similar principles, a target non-uniform heating pattern may be obtained.

In some embodiments, the acquired information, e.g., loss profile, may be predetermined based on known characteristics of the object. For example, in the case of a dedicated oven that repetitively heats products sharing the same physical characteristics (e.g., identical hamburger patties), the processor may be preprogrammed with the energy absorption parameters of the object. In another example, an oven may be configured to heat several different, but predetermined objects, each of different absorption characteristics (for example, various food items distributed by a certain distributor) and the processor may be programmed to load the energy absorption parameters of the object from a database. In some embodiments, the database may be internal to the apparatus, for example, to the processor. In some embodiments, the database may be external, for example, on the Internet, and the processor may be configured to download the information from the external database.

In some embodiments, the acquired information may be based on feedback from the object. For example, various measurement methods may be employed to determine the information indicative of electromagnetic energy loss associated with the object. One particular exemplary method may include measuring the reflected energy from the object by applying electromagnetic energy to the object, e.g., by measuring energy reflected to the transmitting radiating element, and/or by measuring energy transmitted from the transmitting radiating element to other detectors, for example, to other receiving radiating element(s). Based on the feedback information of the reflected energy, the information indicative of electromagnetic energy loss associated with the object may be determined.

The processor may be configured to generate the loss profile based on feedback from the object. For example, when the loss profile is not available in advance or the prior acquired loss profile needs to be refined or re-determined, the processor may be configured to generate the loss profile through a series of steps. In a particular example, the processor may be configured to cause the source to apply electromagnetic energy to the object and measure the reflected energy from the object. Based on the feedback information of the reflected energy, the information indicative of electromagnetic energy loss associated with the object may be determined. In another example, one or more predetermined indicators associated with loss profiles may be stored in advance, and the processor may cause the source to apply electromagnetic energy to the object and detect feedback electromagnetic energy from the object. Based on such feedback information, the processor may generate a loss profile from the one or more predetermined indicators associated with loss profiles.

In some embodiments, the weight to be applied to each of a plurality of electromagnetic field patterns may be determined based on the acquired information. For example, as illustrated in FIGS. 9A and 9B, when the loss properties of parts 922, 924, and 926 are different, in order to achieve a given energy delivery plan, the weight to be applied needs to be adjusted accordingly. For example, if part 922 has a loss property $\sigma_{922}=2\times\sigma_{924}=2\sigma_{926}$, using hot spot 930 to deliver energy to part 922 may be more efficient than using hot spots 940 and 950 to deliver energy to parts 924 and 926, respectively, when the amplitudes of field intensity of all hot spots are the same. Therefore, the weight for applying the first field pattern to generate hot spot 930 needs to be reduced compared to the case where the loss properties of all parts of object 920 are the same, for a given energy delivery plan. The processor may be configured to determine the weight to be applied to each of a plurality of electromagnetic energy patterns based on a predetermined energy distribution in the energy application zone. For example, in FIG. 9A, predetermined energy distributions, including three field patterns having different hot spots, are used to determine the weight. If the amplitudes of field intensity for different hot spots are different, the weight needs to be adjusted accordingly. For example, if hot spot 930 has a higher amplitude of field intensity than those of hot spots 940 and 950, the power level supplied to radiating element 960 may be reduced and/or the time duration for supplying power may be shortened. In this example, hot spot 930 has a higher power density than hot spots 940 and 950 and, therefore, hot spot 930 is capable of applying more energy to part 922, assuming all other conditions are equal. When determining the weight, such differences may be considered. In some applications, solving the equation provided above for T may be a useful route to find the appropriate weights that may result in a target field delivery scheme (e.g., to obtain the volumetric energy transfer information).

The processor may be configured to take into account thermodynamic characteristics of the object. For example, during the energy delivery process, the temperatures of different parts of the object may be different. This may be an intentional result according to a particular energy delivery plan, or may be, for example, due to the fact that energy may be delivered to different parts of the object at different times, or may be due to the non-uniform nature of the filed intensity inside a hot/cold spot. In any case, when there is a temperature difference, thermal energy may diffuse from higher temperature regions to lower temperature regions. As a result, the amount of energy initially delivered to a given region may be lost in that region and gained in another region due to thermal diffusion. Additionally, the heat capacity properties of different objects, or among different parts of a given object, may be different. The heat capacity, also known as specific heat, is a measure of heat or thermal energy required to increase the temperature of a unit quantity of a substance by one temperature unit, and may be measured, for instance by calorie per gram per ° C. Therefore, when the heat capacities of two objects, or two parts of an object, are different (assuming they have the same mass), the temperature rises of these two objects or parts may be different even if the same amount of energy is applied to them. Therefore, thermodynamic characteristics of the object, such as heat conduction, heat capacity, and a specific mass of at least a portion of the object may be taken into consideration during the energy delivery process.

As noted above, the apparatus may include multiple radiating elements, and the processor may be configured to employ a subset of the multiple radiating elements in order to achieve a predetermined field pattern. For example, in FIG. 9A, multiple radiating elements are employed, and each of them corresponds to a predetermined field pattern. In this example, the processor may be configured to select a subset of the three radiating elements in order to achieve a desired field pattern.

In some embodiments, radiating elements may be selected for exciting a certain mode in accordance with the positioning of the radiating elements in the energy application zone. The position of the radiating element may be selected to effectively excite a desired mode and/or to reject an undesired mode. This and other optional features of some embodiments are explained below in reference to FIGS. 12A, 12B, 12C, 13A, and 13B.

Figure 12A:
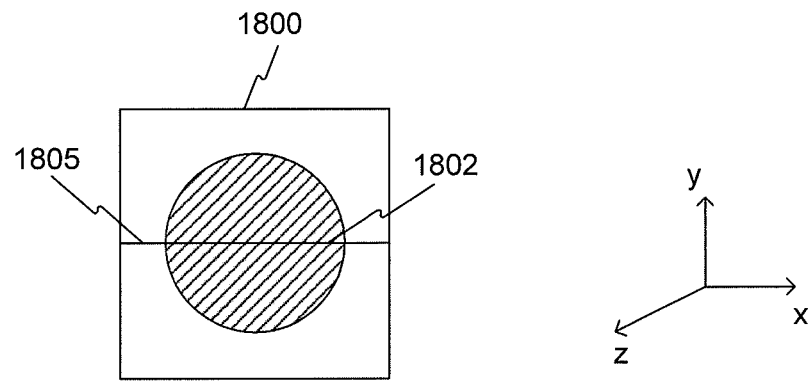
FIGS. 12A, 12B, and 12C illustrate field intensity distributions of modes that may be excited in an energy application zone according to some embodiments of the invention.
Figure 12B:
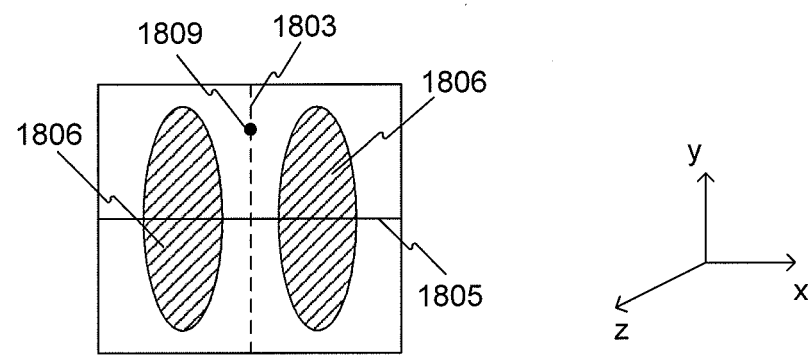

The concept of rejecting modes may be illustrated by FIGS. 12A and 12B, which show X-Y cross sections of two modes 1802 and 1806 excitable in cavity 1800. Mode 1802 is a $TM_{11}$ mode and mode 1806 is a $TM_{21}$ mode. Mode $TM_{11}$ may be excitable at every frequency that is equal to or greater than a lower cutoff frequency $f_{11}$ and $TM_{21}$ may be excitable at every frequency that is equal to or greater than a higher cutoff frequency $f_{21}$. Thus, at intermediate frequencies between $f_{11}$ and $f_{21}$, $TM_{11}$ may be excited without exciting $TM_{21}$, but there is no frequency at which $TM_{21}$ is excitable and $TM_{11}$ is not. Therefore, if one desires exciting $TM_{11}$ at a frequency higher than $f_{21}$ without exciting $TM_{21}$, $TM_{21}$ may have to be rejected. In the present discussion, rejecting a mode may refer to preventing or substantially decreasing the excitation of the mode.

In some embodiments, a desired mode may be excited and an undesired mode may be simultaneously rejected by selecting for the excitation a radiating element positioned at or near a null of the undesired mode, and at or near a maximum of the desired mode. A null of a mode is any location in the energy application zone where the field intensity of the mode is permanently (or in all phases) zero, and a maximum of a mode is any location where the field intensity of the mode reaches an overall maximal value at all phases (or at every instant). A radiating element positioned at the null of a mode does not excite the mode (regardless of the frequency applied), and a radiating element positioned near the null may excite the mode only to a small degree. For example, in FIG. 12B line 1803 is a collection of null points of mode $TM_{21}$; thus, a radiating element positioned at any point along this line may not excite mode $TM_{21}$, even at frequencies higher than $f_{21}$. However, since point 1809 (which is along line 1803) is not at a null of mode $TM_{11}$ (1802), mode 1802 may be excited by a radiating element positioned at point 1809. It is noted that line 1803 is actually a plane, going all along the cavity. Similarly, point 1809 is a line, going all along the cavity, from the upper to the lower base, perpendicularly to the bases. In practice, the radiating element may be positioned anywhere on plane 1803 without exciting mode 1806. In some embodiments, however, the radiating elements may be positioned at the upper (and/or lower) base of the cavity, at a position in the XY plane.

Figure 13A:
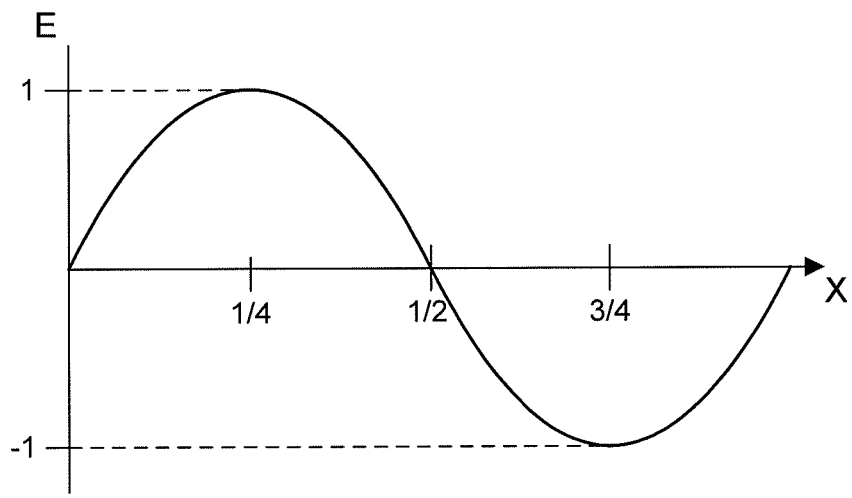
FIGS. 13A and 13B show calculated values of normalized electric field magnitude of two modes excitable at the same frequency in a cavity, along an X axis on a cross-section perpendicular to the Z axis.

Another way to reject a mode may include using two or more radiating elements, positioned at two or more locations where the magnitude of the electric field of the mode to be rejected is of opposite signs. For example, FIG. 13A depicts the (normalized) magnitude of the electric field of mode 1806 along line 1805. As shown in the figure, at x=0.5 (which is a point on line 1803), the field is zero, at x=0.25 the field is +1 and at x=0.75 the field is −1. Thus, in some embodiments, two radiating elements, one at x=0.25 and the other at x=0.75 (or at any other two points where the field has opposite signs and equal magnitudes) may be selected to radiate RF waves at the same amplitude and phase, to cancel each other, and thus reject an undesired mode. If the fields at the locations of the two radiating elements have opposite signs and different absolute values, they may still be used for rejecting the undesired mode, if, for instance, their amplitudes are tuned such that sum of the products of field and amplitude at each radiating element location is zero. It is noted that while the above discussion is focused on different points along the X axis, similar considerations may be applied also for points having different y values and/or z values.

In some embodiments, a desired mode may be excited by emitting energy via two antennas that are oriented anti parallel to each other, or that are oriented parallel to each other but emit waves at a phase shift of 180° between each other, and located at points where the field pattern has opposite sign. Similarly, in some embodiments, modes may be rejected by emitting energy via two antennas that are oriented anti parallel to each other, or that are oriented parallel to each other but emit waves at a phase shift of 180° between each other, and located at points where the field pattern has the same sign.

Figure 13B:
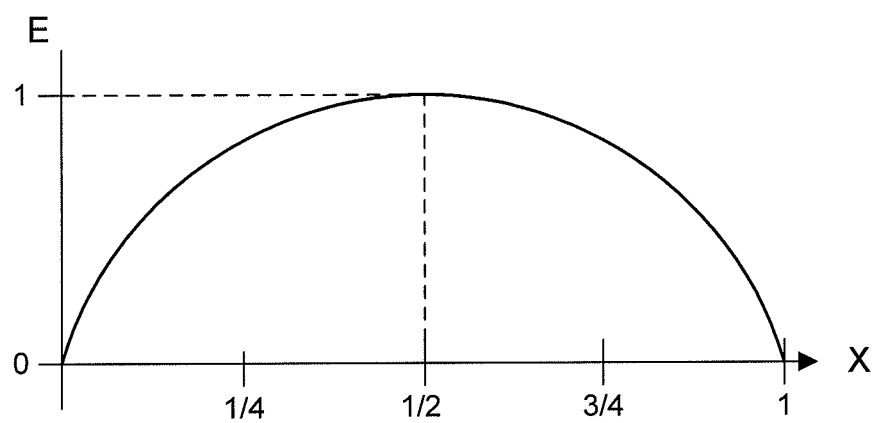

FIG. 13B depicts the (normalized) magnitude of the electric field of mode 1802 along line 1805. As shown in the figure, at x=0.5, the field is maximal, and the field at x=0.25 is equal (both in magnitude and in sign) to the field at x=0.75. Thus, two antennas, one at x=0.25 and the other at x=0.75 that emit at the same amplitude and phase may tend to excite mode 1802. However, two antennas that are oriented anti parallel to each other, or that are oriented parallel to each other but with a phase shift of 180° between each other, may reject mode 1802. Consequently, the latter combination of antennas and phases may excite mode $TM_{21}$ and rejects mode $TM_{11}$.

In some embodiments, a desired and/or an undesired mode is a resonant mode. A resonant mode may be excited when the frequency f of the electromagnetic wave corresponds to the dimensions of the energy application zone in a manner known in the art. For example, in an energy application zone that is a rectangular cavity, a resonant mode may be excited when the dimension, along which the electromagnetic wave propagates, referred to herein as $h_z$, is equal to $N*(\lambda/2)$, where N is a whole number (e.g. 0, 1, 2, 3) and $\lambda$ is the wavelength, given by the equation $\lambda=c/f$, where c is the light velocity in the cavity. A resonant mode is usually marked with three index numbers, where the third index number is N.

When a single resonant mode is excited at a given frequency, a great majority of the power carried with the excitation may be carried by the resonant mode, and other modes, which may be propagating or evanescent, may carry a smaller portion of the power, which may be negligible. Thus, when a single resonant mode is excited, there may be little or no need to reject non-resonating modes.

For example, when $h_z=c/f_{21}$ (i.e. when N=2) the antennas and frequency may be selected to excite mode $TM_{21}$ there may be little need to reject, for example, mode $TM_{11}$, because, although mode $TM_{11}$ may be excitable at the applied frequency, it may carry only a small amount of the power, in comparison to the amount of power carried by the resonant mode $TE_{212}$.

Thus, in some embodiments, resonant modes may be used for achieving a target field intensity distribution. This may facilitate control over the excited modes, provided sufficient bandwidth and frequency control.

In some embodiments, mode excitation may be further facilitated, (e.g., by easing the requirements from bandwidth and frequency control), by using a degenerate cavity. A degenerate cavity is one in which at least one cut off frequency is a cut off frequency of two or more modes of the same family (e.g., two TE modes). Similarly, each resonant frequency (except for, sometimes, the lowest one) may excite two or more resonant modes of the same family. Some shapes of degenerate cavities may include, for example, cylinder and sphere.

In some embodiments, one desired resonant mode and one or more undesired resonant modes may be excited at a same frequency, and the non-desired modes may be rejected as described above.

Figure 12C:
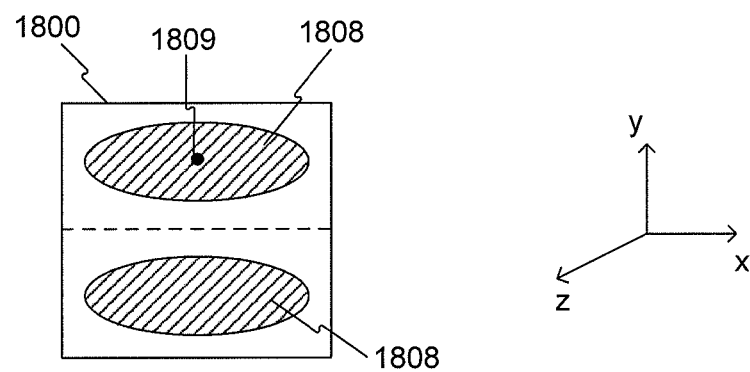

For example, the same frequency that excites mode $TM_{212}$, a cross section of which is shown as 1806 in FIG. 12B may excite also mode $TM_{212}$, a cross section of which is illustrated as 1808 in FIG. 12C. However, if the excitation is via a radiating element positioned at a null of mode 1808, which is not a null of mode 1806, only mode 1808 may be excited. For example, if the radiating element radiates at frequency $f_{12}=f_{21}$ at point 1809, shown in FIGS. 12B and 12C, only mode 1808 may be excited.

Thus, in accordance with some embodiments of the invention, there is provided an apparatus for exciting multiple modes (e.g. 3, 4, 5, 6, 7, or higher number), and controlling which of the modes is effectively excited at each given instance. The apparatus may include a processor, configured to determine which of the multiple modes is to be effectively excited at some instance and at which weight; and may select excitation scheme that may effectively excite only the determined mode. The excitation scheme may include, for example, identity of radiating elements to participate in the excitation (and optionally shortcutting non-selected radiating elements), setting the phase difference between two or more the selected radiating elements, and setting amplitude differences between them, such that the predetermined mode may be effectively excited, and other modes may be rejected. In some embodiments, the processor may be configured to determine the modes to be excited so as to excite a target field intensity distribution in the energy application zone, considering a given loss profile of the energy application zone or a portion thereof. The given loss profile may be acquired by the processor.

Figure 11:
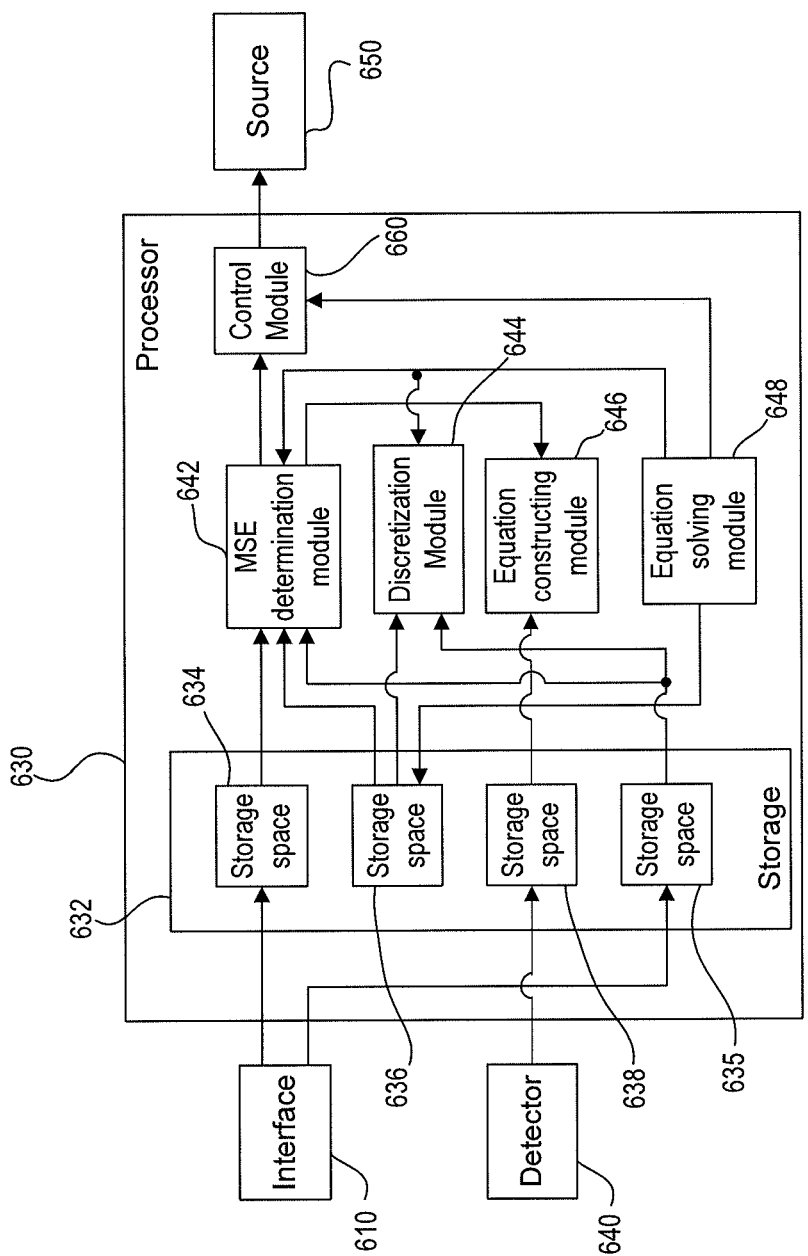
FIG. 11 is a simplified block diagram of a processor configured to construct a loss profile based on feedback from an energy application zone, according to some embodiments of the invention.

FIG. 11 is a simplified block diagram of a processor 630 configured to apply electromagnetic energy in accordance with some embodiments of the invention. Processor 630 may be the same as, may include, or may be part of processor 30. Additionally or alternatively, processor 630 may be in addition to processor 30.

Processor 630 is shown to include storage 632 (which also may be referred as memory), for storing data, and several processing modules for processing data, for example, data stored on storage 632. Storage 632 may be continuous, segmented, or may have any other configuration as known in the art of storing data electronically. Storage 632 may also be separate from processor 630, for example, on a disk. The modules may be implemented using hardware and/or software and may include, for example, software routines. In some embodiments, two or more of the modules shown in the figure may be united to a single module, which performs the tasks of the two modules shown, or may be spread between several modules.

Optionally, processor 630 may be connected to an interface 610, for receiving data via the interface. For example, field patterns that may be obtained with different MSEs may be received from the interface, and stored on storage 632, for example, in dedicated storage space 634. Storage space 634 may also store the MSEs, such that each stored MSE may be associated with a stored field pattern, predicted to be excited in the energy application zone when energy is applied to the zone at that MSE. Optionally, the field patterns associated with the MSEs may be obtained with empty energy application zone, and/or the energy application zone may have a standard load in it (for example, a piece of meat at the center of the zone, a toast at one side of the zone and salad on another side, etc). Optionally, the standard load may be similar to typical loads known to be used in the energy application zone (for example one or more foods that are usually cooked in the oven, or that the oven is expected to cook often).

Additionally or alternatively, a target field intensity distribution (e.g., a volumetric energy transfer information) may be received via the interface. Such target field intensity distribution may be stored on storage 632, for example, in dedicated storage space 635.

In some embodiments, storage 632 may also have storage space 636, for storing a loss profile or other information indicative of RF energy loss associated with at least a portion of the energy application zone or the object. For example, storage space 636 may store a loss profile of the energy application zone obtained in a preceding loss profile reconstruction cycle. Additionally or alternatively, storage space 636 may store a predicted loss profile. The prediction may be obtained based on knowledge of the object in the energy application zone, its composition, location, orientation, temperature, and/or any other parameter that may affect the loss profile. The stored loss profile may be sent to storage space 636, for example, from interface 610, from another interface (not shown), or from an equation solving module 648 described below. For example, the stored loss profile may be calculated or otherwise predicted by another apparatus and/or at an earlier date, and sent to storage space 636 via interface 610.

Optionally, storage 632 may also have a storing space 638 for storing energy distributions and/or field intensity distributions obtained in the energy application zone during energy application.

Processor 630 is shown to include an MSE determination module 642. Module 642 may be configured (optionally, by running a suitable software) to determine which of the available MSEs are to be used at any stage of operation, e.g., during an energy application process. In some embodiments, all the available MSEs may be used by default, and MSE determination module 642 may be omitted. In other embodiments, module 642 may determine MSEs to be used, for example, based on the predicted loss profile and/or based on the target field intensity distribution. For this, module 642 may be allowed to retrieve predicted loss profile data and/or data concerning a target field intensity distribution stored on storage space 636 and/or 635. Alternatively or additionally, module 642 may select MSEs that are relatively easier to excite and/or control, and may select other MSEs only if, for example, the easily excited MSEs do not provide satisfactory results.

Optionally, module 642 is connected to control module 660, which may control source 650 of electromagnetic energy to excite the selected MSEs. Control module may control source 650 to excite the selected MSEs at the respective weights (which may be determined by equation solving module 648 as described below). A power supply, a modulator, an amplifier, and/or radiating element(s) (or portions thereof), for example power supply 12, modulator 14, amplifier 16, and radiating element 18 illustrated in FIG. 1, may be parts of source 650. In some embodiments, the energy distribution obtained in the energy application zone as a result of the excitation may be measured. The measurements may be carried out by one or more detectors, shown collectively as 640. One or more of detectors 640 may be a part of source 650, and the others, if any, may be separate and/or independent from source 650. It is noted that in FIG. 11 source 650 and detector 640 are shown at two sides of processor 630, although in practice they may be embodied in the same parts, for example, the same antennas may be used for supplying energy to the energy application zone and for measuring excited field patterns, even if not necessarily at the same time. The results of the measurements may be stored on storage space 638.

Processor 630 is also shown to include a discretization module 644, configured to divide the energy application zone to regions, for example, as depicted in FIG. 7A, 7B, or 7C. Optionally, discretization module 644 may divide the energy application zone in accordance with a loss profile stored in storage space 636. For example, module 644 may divide the zone more densely where more abrupt loss changes are present in the predicted loss profile.

Additionally or alternatively, discretization module 644 may divide the energy application zone in accordance with a target field intensity distribution stored in storage space 635. For example, module 644 may divide the zone more densely where more abrupt field intensity changes are present in the target field intensity distribution.

In some embodiments, the predicted loss profile and/or the target field intensity distribution may be provided in accordance with a given discretization, for example, as a matrix of values, each associated with one portion of the energy application zone.

Module 644 may then discretize the energy application zone in accordance with the discretization by which the predicted profile and/or target distribution are provided. For this, module 644 may be allowed to retrieve data from storage spaces 635 and/or 636, saving the predicted profile and the target distribution. For example, module 644 may divide the energy application zone such that volumes characterized by similar losses will be included in a single region. Additionally or alternatively, module 644 may divide the energy application zone such that volumes wherein similar field intensity is desired will be included in a single region. Discretization module 644 may also divide the energy application zone in accordance with a predetermined discretization scheme, for example, a default discretization scheme. One possible default discretization scheme is illustrated in FIG. 7A.

Processor 630 is also shown to include equation constructing module 646, configured to construct equations according to, for example, the equation $T=WP^{-1}$, discussed above, in order to obtain the target field intensity distribution. For this, module 646 may define the field intensity of each of the MSEs which may be selected by module 642, in each region to which the energy application zone is divided by module 644, and may take into account measurement results stored at storage space 638, loss values associated with the regions, and target field intensity associated with each of the regions.

Once the equations are constructed by module 646, equation solving module 648 may solve the equations, for example, by linear programming or any other means known in the art for solving linear equations. Equation solving module 648 may solve the equations in order to obtain the respective weights of each MSEs or field pattern. If equation solving module 648 determines that the equations are not solvable or that the solution is not satisfactory, for example is not sufficiently stable, module 648 may trigger module 642 and/or module 644 to amend the selected MSEs and/or the discretization.

If the equations are solved, the obtained weights may be saved, for example, at storage 635, for guiding energy application to the energy application zone at the present operation stage, or at as input for the equation solving module in a later stage.

The correlation between field pattern and amount of energy applied may be determined by the energy absorption profile of the object at issue. That is, once an object's ability to absorb energy throughout its volume is determined, then energy can be applied to the object in a controlled manner in order to achieve a desired goal. For example, if the goal is to uniformly apply energy across an object's volume, then the processor might select combinations of MSEs that result in uniform energy application. If on the other hand, non-uniform energy application is desired, then the processor might apply predetermined amounts of energy using selected field patterns in order to achieve the desired non-uniformity.

A coordinate system may be established to represent the spatial locations of hot/cold spots. As discussed earlier, each MSE may result in a predictable field pattern with predictable hot/cold spots. Based on these principles, the processor may discretize the energy application zone or portion thereof by causing the processor to be preprogrammed with the coordinates of each hot/cold spot in each field pattern corresponding to each MSE.

With information relating to the spatial locations of hot and cold spots within the energy application zone, the processor may determine information about an object within the zone, including, for example, the shape and/or the position of the object. During operation, when the processor receives an indication that the detector has received feedback indicative of energy absorption during a particular MSE condition, the processor may be configured to recognize that an object may be located in one or more of the hotspots corresponding to that MSE condition. Based on the feedback information available, the processor may determine whether an object is located in some combination of hot and cold spots associated with an MSE condition. The more MSEs that are tested for feedback, the more information the processor can use to learn about the location and the absorptive properties of the object in the energy application zone. Over a series of such measurements with differing MSEs, the processor may continually refine a feedback-derived location of the object in the zone. Using this feedback, the processor may be able to determine the absorptive properties of discrete regions within the object as well as the spatial locations of those regions within the object.

In some exemplary embodiments, the processor may regulate the source to apply energy repetitively to the energy application zone. For example, the processor may apply an MSE and cause its corresponding field pattern in the energy application zone for a predetermined time period, then apply another MSE and cause another field pattern in the energy application for another predetermined time period. Such energy application duration and/or energy application rate may vary. For example, in some embodiments, energy may be applied to the energy application zone 120 times per second. Higher (e.g. 200/second, 300/second) or lower (e.g., 100/second, 20/second, 2/second, 1/second, 30/minute) rates may be used, as well as uneven energy application rates.

In some embodiments, a set of MSEs may be applied sequentially during a period of time (herein referred to as "a sweep"). And the sweep may also be repeated at a predetermined rate or after a predetermined interval. At times, a sweep sequence (e.g., one or more sweeps) may be performed once every 0.5 seconds or once every 5 seconds or at any other rate, such as higher, lower or intermediate. It is to be understood that the MSE selection in different scans may or may not the same.

In some embodiments, the processor may control the performance of one or more sweeps in order to acquire information on the loss profile, and then perform one or more sweeps to process (e.g. heat) the object based on the acquired loss profile. In some embodiments, the loss profile may change during heating, and sequences of loss-profile acquisition and heating sweeps may be repeated. Optionally, a loss profile acquisition sweep may use lower energy (or power) levels than a heating sweep.

After a given amount of energy (e.g., 10 kJ or less or 1 kJ or less or several hundreds of joules or even 100 J or less were applied or dissipated into the object or into a given portion of the object (e.g., by weight such as 100 g or by percentage, such as 50% of load)), a new scan may be performed.

In exemplary embodiments of the invention, the rate of energy application or the rate of scan (for example, the duration of energy application at each MSE within a scan, the total duration of each scan, energy application interventions between scans, etc) may depend on the rate of change in spectral information between energy applications or between scans. For example, a threshold of change in dissipation and/or frequencies (e.g., a 10% change in sum integral) may be provided or different change rates associated with different energy application/scan rates, for example using a table. In another example, what is determined is the rate of change between energy applications/scans (e.g., if the average change between energy applications/scans is less than the change between the last two energy applications/scans). Such changes may be used to adjust the period between energy applications/scans once or more than once during energy application process. Optionally or alternatively, changes in the system (e.g., movement of the object or structure for hold the object) may affect the energy applications/scans rate (typically major changes increase the rate and minor or no changes decrease it).

Various examples of the invention are described herein in connection with spatially controlled energy delivery. Persons of ordinary skill in the art will appreciate that core, inventive principles of energy application discussed herein may be applied across various forms of energy application zones, and for a variety of purposes other than or including heating. In many respects, it is these broader principles that are the subject of the appended claims.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. Thus, it is intended that the specification and examples be considered as exemplary only, with a true scope of the present disclosure being indicated by the following claims and their equivalents.

What is claimed is:

1. An apparatus for applying radio frequency (RF) energy to an object in a cavity, the apparatus comprising:
   a source of RF energy; at least two radiating elements configured to receive RF energy from the source and apply RF energy to the cavity; and
   a processor configured to:
      acquire a characteristic of energy absorption associated with a region in the cavity;
      calculate, based on the acquired characteristic, a weight for each of a plurality of sets of frequency and phase values of electromagnetic waves to be applied to the cavity; and
      control the source to apply RF energy to the cavity using electromagnetic waves having the frequency and phase values in each of the plurality of sets in accordance with each of the weights calculated for the plurality of sets, wherein the electromagnetic waves are applied according to time durations in accordance with each of the weights calculated for the plurality of sets, power levels in accordance with each of the weights calculated for the plurality of sets, or a combination thereof in accordance with each of the weights calculated for the plurality of sets; and
      control the source by regulating a phase modulator to set a phase difference between the electromagnetic waves to generate the plurality of sets.

2. The apparatus according to claim 1, wherein the processor is configured to:
   receive, from a user, information regarding a spatial distribution of a dielectric property of the object; and
   calculate each of the weights for the plurality of sets according to the information regarding the spatial distribution of the dielectric property of the object.

3. The apparatus according to claim 1, wherein the processor is configured to:
   receive, from a user, information regarding a position of the object in the cavity; and
   calculate each of the weights for the plurality of sets according to the information regarding the position of the object in the cavity.

4. The apparatus according to claim 1, wherein the processor is configured to:
   receive signals indicative of feedback from the object; and
   determine the characteristic of energy absorption associated with the region in the cavity based on the signals.

5. The apparatus according to claim 4, wherein the at least one of the at least two radiating elements are configured to receive the feedback from the object.

6. The apparatus according to claim 1, wherein the processor is configured to:
   acquire a plurality of characteristics of energy absorption, each associated with a respective region in the cavity.

7. The apparatus according to claim 6, wherein the plurality of characteristics of energy absorption are dynamically determined.

8. The apparatus according to claim 1, wherein the processor is configured to:

calculate each of the weights for the plurality of sets based on thermodynamic characteristics of the object,
wherein the thermodynamic characteristics of the object include at least one of heat conduction, heat capacity, or a specific mass of at least a portion of the object.

9. The apparatus according to claim 1, wherein the processor is configured to:
cause the source to generate electromagnetic waves having the frequency and phase values in each of the plurality of sets at a power level that is based on the weight calculated for each of the plurality of sets.

10. The apparatus according to claim 1, wherein the processor is configured to:
cause the source to generate electromagnetic waves having the frequency and phase values in each of the plurality of sets for a time duration that is based on the weight calculated for each of the plurality of sets.

11. The apparatus according to claim 1, comprising:
a plurality of radiating elements,
wherein the processor is configured to select one or more of the plurality of radiating elements to apply electromagnetic waves having the frequency and phase values in each of the plurality of sets.

12. The apparatus according to claim 1, comprising the cavity.

13. The apparatus according to claim 1, comprising:
an interface for receiving, from a user, input regarding volumetric energy transfer information,
wherein the processor is configured to calculate the weight for each of the plurality of sets based on the volumetric energy transfer information.

14. The apparatus according to claim 1, comprising:
an interface for receiving, from a user, an amount of energy to be delivered to or absorbed in one or more regions in the cavity,
wherein the processor is configured to calculate the weight for each of the plurality of sets based on the acquired characteristic and the amount of energy.

15. A method for applying radio frequency (RF) energy from a source of RF energy to an object in a cavity via at least two radiating element, the method comprising:
acquiring, by a processor, a characteristic of energy absorption associated with a region in the cavity;
calculating, by the processor, for each of a plurality of sets of frequency and phase values of electromagnetic waves to be applied to the cavity, a weight based on the acquired characteristic; and
controlling, by the processor, the source to apply RF energy to the cavity using electromagnetic waves having the frequency and phase values in each of the plurality of sets in accordance with each of the weights calculated for the plurality of sets, wherein the electromagnetic waves are applied according to time durations in accordance with each of the weights for the plurality of sets, power levels in accordance with each of the weights for the plurality of sets, or a combination thereof in accordance with each of the weights for the plurality of sets; and control the source by regulating a phase modulator to set a phase difference between the electromagnetic waves to generate the plurality of sets.

16. The method according to claim 15, comprising:
receiving, from a user, information regarding a spatial distribution of a dielectric property of the object; and
calculating each of the weights for the plurality of sets according to the information regarding the spatial distribution of the dielectric property of the object.

17. The method according to claim 15, comprising:
receiving, from a user, information regarding a position of the object in the cavity; and
calculating each of the weights for the plurality of sets according to the information regarding the position of the object in the cavity.

18. The method according to claim 15, comprising:
generating a loss profile based on feedback from the object; and
calculating each of the weights for the plurality of sets based on the loss profile.

19. The method according to claim 15, wherein calculating each of the weights for the plurality of sets includes:
calculating each of the weights for the plurality of sets based on thermodynamic characteristics of the object,
wherein the thermodynamic characteristics of the object include at least one of heat conduction, heat capacity, or a specific mass of at least a portion of the object.

20. The method according to claim 15, comprising:
receiving, from a user, an amount of energy to be delivered to or absorbed in one or more regions in the cavity; and
calculating each of the weights for the plurality of sets based on the acquired characteristic and the amount of energy.

21. The method according to claim 15, comprising:
receiving, from a user, input regarding volumetric energy transfer information; and
calculating each of the weights for the plurality of sets based on the volumetric energy transfer information.

22. The method according to claim 15, comprising:
causing, by the processor, the source to generate electromagnetic waves having the frequency and phase values in each of the plurality of sets at a power level that is based on each of the weights calculated for the plurality of sets.

23. The method according to claim 15, comprising:
causing, by the processor, the source to generate electromagnetic waves having the frequency and phase values in each of the plurality of sets for a time duration that is based on each of the weights calculated for the plurality of sets.

24. The method according to claim 15, comprising:
acquiring a plurality of characteristics of energy absorption, each associated with a respective region in the cavity.

* * * * *